US010752139B2

(12) United States Patent
Plante et al.

(10) Patent No.: US 10,752,139 B2
(45) Date of Patent: Aug. 25, 2020

(54) DYNAMIC MOTION CONTROL SYSTEM USING MAGNETORHEOLOGICAL FLUID CLUTCH APPARATUSES

(71) Applicant: EXONETIK INC., Sherbrooke (CA)

(72) Inventors: Jean-Sebastien Plante, Sherbrooke (CA); Marc Denninger, Sherbrooke (CA); Guifre Julio, Sherbrooke (CA); Patrick Chouinard, Sherbrooke (CA); Pascal Larose, Sherbrooke (CA); Caroline Fraser, Sherbrooke (CA)

(73) Assignee: EXONETIK INC., Sherbrooke (CA)

( * ) Notice: Subject to any disclaimer, the term of this patent is extended or adjusted under 35 U.S.C. 154(b) by 194 days.

(21) Appl. No.: 15/714,452

(22) Filed: Sep. 25, 2017

(65) Prior Publication Data

US 2018/0072189 A1   Mar. 15, 2018

Related U.S. Application Data

(63) Continuation-in-part of application No. PCT/CA2016/050598, filed on May 26, 2016.
(Continued)

(51) Int. Cl.
*B60N 2/50*  (2006.01)
*F16D 37/02*  (2006.01)
(Continued)

(52) U.S. Cl.
CPC .......... *B60N 2/501* (2013.01); *B60G 17/0157* (2013.01); *B60G 21/0555* (2013.01);
(Continued)

(58) Field of Classification Search
CPC ...... B60N 2/0232; B60N 2/162; B60N 2/501; B60N 2/502; B60G 17/0157; B60G 21/0555; B60G 99/002
See application file for complete search history.

(56) References Cited

U.S. PATENT DOCUMENTS 3,144,270 A * 8/1964 Bilancia ................. B60N 2/502
  248/397
3,163,466 A * 12/1964 Radke ..................... B60N 2/22
  297/307

(Continued)

FOREIGN PATENT DOCUMENTS

CN   100486824 C   5/2009
CN   101737449 B   12/2009
(Continued)

*Primary Examiner* — Eret C McNichols
(74) *Attorney, Agent, or Firm* — Norton Rose Fulbright Canada LLP

(57) ABSTRACT

An active suspension system comprises at least one biasing device configured to support a body from a structure, and at least one motor. A magnetorheological (MR) fluid clutch apparatus(es) is coupled to the at least one motor to receive torque from the motor, the MR fluid clutch apparatus controllable to transmit a variable amount of torque. A mechanism is between the at least one MR fluid clutch apparatus and the body to convert the torque received from the at least one MR fluid clutch apparatus into a force on the body. Sensor(s) provide information indicative of a state of the body or structure. A controller receives the information indicative of the state of the body or structure and for outputting a signal to control the at least one MR fluid clutch apparatus in exerting a desired force on the body to control movement of the body according to a desired movement behavior.

16 Claims, 30 Drawing Sheets

Related U.S. Application Data

(60) Provisional application No. 62/185,254, filed on Jun. 26, 2015, provisional application No. 62/166,400, filed on May 26, 2015.

(51) Int. Cl.
  *B60G 99/00* (2010.01)
  *F16D 48/06* (2006.01)
  *B60N 2/02* (2006.01)
  *B60N 2/16* (2006.01)
  *B60G 17/015* (2006.01)
  *B60G 21/055* (2006.01)
  *F16D 47/06* (2006.01)
  *F16D 37/00* (2006.01)

(52) U.S. Cl.
  CPC ......... *B60G 99/002* (2013.01); *B60N 2/0232* (2013.01); *B60N 2/162* (2013.01); *B60N 2/502* (2013.01); *F16D 37/02* (2013.01); *F16D 48/06* (2013.01); *B60G 2202/413* (2013.01); *B60G 2202/43* (2013.01); *B60G 2202/44* (2013.01); *F16D 37/008* (2013.01); *F16D 47/06* (2013.01); *F16D 2037/001* (2013.01); *F16D 2500/1026* (2013.01); *F16D 2500/10418* (2013.01); *F16D 2500/10475* (2013.01); *F16D 2500/3027* (2013.01); *F16D 2500/7041* (2013.01)

(56) References Cited

U.S. PATENT DOCUMENTS

| | | | | |
|---|---|---|---|---|
| 3,874,326 A * | 4/1975 | Pickens | B63C 7/26 | 116/211 |
| 3,888,451 A * | 6/1975 | Lacey | B60N 2/502 | 248/567 |
| 4,461,444 A * | 7/1984 | Grassl | B60N 2/501 | 248/430 |
| 4,611,783 A * | 9/1986 | Sakamoto | B60N 2/502 | 108/145 |
| 4,638,982 A * | 1/1987 | Misher | B60N 2/501 | 248/550 |
| 4,640,488 A * | 2/1987 | Sakamoto | B60N 2/502 | 108/145 |
| 4,685,731 A * | 8/1987 | Migut | B60N 2/164 | 108/147 |
| 4,885,918 A * | 12/1989 | Vaccaro | A61G 11/00 | 600/22 |
| 4,941,641 A * | 7/1990 | Granzow | B60N 2/501 | 248/161 |
| 5,169,112 A * | 12/1992 | Boyles | B60N 2/501 | 248/550 |
| 5,176,355 A * | 1/1993 | Carter | B60N 2/502 | 248/550 |
| 5,186,486 A | 2/1993 | Hynds et al. | | |
| 5,251,864 A * | 10/1993 | Itou | B60N 2/502 | 248/588 |
| 5,309,861 A * | 5/1994 | Mardikian | B60N 2/502 | 114/363 |
| 5,364,060 A * | 11/1994 | Donovan | B60N 2/502 | 248/421 |
| 5,642,916 A * | 7/1997 | Dybro | B60N 2/4221 | 296/68.1 |
| 5,652,704 A * | 7/1997 | Catanzarite | B60N 2/501 | 701/49 |
| 5,749,807 A | 5/1998 | Webb et al. | | |
| 5,823,309 A | 10/1998 | Gopalswamy et al. | | |
| 5,845,753 A | 12/1998 | Bansbach et al. | | |
| 5,954,400 A * | 9/1999 | Brodersen | B60N 2/502 | 248/280.11 |
| 5,957,426 A * | 9/1999 | Brodersen | B60N 2/502 | 248/421 |
| 5,975,508 A | 11/1999 | Beard et al. | | |
| 5,993,358 A | 11/1999 | Gureghian | | |
| 6,022,030 A | 2/2000 | Fehring | | |
| 6,095,295 A | 8/2000 | Park et al. | | |
| 6,082,715 A | 9/2000 | Vandermolen | | |
| 6,264,163 B1 * | 7/2001 | Ivarsson | B60N 2/501 | 248/550 |
| 6,371,456 B1 * | 4/2002 | Ritchie | B60N 2/501 | 248/550 |
| 6,550,788 B2 | 4/2003 | Schmidt et al. | | |
| 6,681,905 B2 | 1/2004 | Edmondson et al. | | |
| 6,705,238 B1 * | 3/2004 | Heckert | B66F 7/065 | 108/145 |
| 6,736,758 B1 | 5/2004 | Reddy et al. | | |
| 6,948,707 B2 | 9/2005 | Gradu | | |
| 7,152,839 B2 * | 12/2006 | Mullinix | B60N 2/501 | 248/421 |
| 7,261,176 B2 | 8/2007 | Chun et al. | | |
| 7,568,675 B2 * | 8/2009 | Catton | B60N 2/502 | 248/421 |
| 7,637,360 B2 * | 12/2009 | Carlson | A47C 1/03 | 188/267.2 |
| 7,694,946 B2 * | 4/2010 | Shoemaker | B60N 2/501 | 248/550 |
| 7,712,836 B2 * | 5/2010 | Deml | B60N 2/501 | 297/344.12 |
| 7,770,974 B2 * | 8/2010 | Ott | B60N 2/501 | 297/344.15 |
| 7,810,884 B2 * | 10/2010 | Lorey | B60N 2/501 | 297/344.16 |
| 7,975,813 B2 * | 7/2011 | Spangler | B60N 2/38 | 188/267 |
| 7,983,813 B2 | 7/2011 | Ummethala et al. | | |
| 8,118,287 B2 * | 2/2012 | Schordine | B60N 2/502 | 248/241 |
| 8,342,541 B2 * | 1/2013 | Wurmthaler | B60N 2/501 | 248/636 |
| 8,366,195 B2 * | 2/2013 | Haller | B60N 2/501 | 248/157 |
| 8,424,832 B2 | 4/2013 | Robbins | | |
| 8,548,678 B2 | 10/2013 | Ummethala et al. | | |
| 8,690,174 B2 | 4/2014 | Grau et al. | | |
| 8,744,694 B2 | 6/2014 | Ystueta | | |
| 8,781,681 B2 * | 7/2014 | Parison, Jr. | B60N 2/501 | 280/5.5 |
| 8,931,750 B2 * | 1/2015 | Kohl | B60N 2/502 | 248/588 |
| 9,266,453 B2 * | 2/2016 | Haller | B60N 2/527 | |
| 9,291,300 B2 * | 3/2016 | Parker | F16M 13/02 | |
| 2001/0035600 A1 | 11/2001 | St Clair | | |
| 2003/0075401 A1 * | 4/2003 | Carlson | B62D 5/006 | 188/267 |
| 2004/0090100 A1 * | 5/2004 | Igarashi | B60N 2/502 | 297/344.15 |
| 2004/0159763 A1 * | 8/2004 | Mullinix | B60N 2/501 | 248/421 |
| 2004/0163904 A1 | 8/2004 | Anderfaas | | |
| 2005/0017462 A1 | 1/2005 | Kroppe | | |
| 2005/0110243 A1 * | 5/2005 | Meier | B60N 2/002 | 280/727 |
| 2006/0095180 A1 | 5/2006 | Ummethala et al. | | |
| 2006/0200287 A1 | 9/2006 | Parison et al. | | |
| 2006/0237885 A1 | 10/2006 | Paillard et al. | | |
| 2007/0278057 A1 * | 12/2007 | Wereley | B60N 2/4242 | 188/267.1 |
| 2007/0278723 A1 | 12/2007 | Shoemaker et al. | | |
| 2008/0015753 A1 * | 1/2008 | Wereley | B60N 2/4242 | 701/45 |
| 2008/0042480 A1 * | 2/2008 | Volkman | B60N 2/14 | 297/344.21 |
| 2008/0156602 A1 * | 7/2008 | Hiemenz | B60N 2/4242 | 188/267.1 |
| 2009/0134595 A1 * | 5/2009 | Haller | B60G 17/0155 | 280/124.157 |
| 2010/0102493 A1 * | 4/2010 | Deml | B60N 2/502 | 267/140.11 |

(56) References Cited

U.S. PATENT DOCUMENTS

| | | | | |
|---|---|---|---|---|
| 2010/0122881 A1* | 5/2010 | Carlson | | A47C 1/03 188/267 |
| 2010/0133413 A1* | 6/2010 | Wahls | | B60N 2/502 248/566 |
| 2010/0224343 A1* | 9/2010 | Fukuma | | B25J 19/0054 165/67 |
| 2010/0332079 A1* | 12/2010 | Wang | | B60N 2/4242 701/37 |
| 2011/0001342 A1* | 1/2011 | Deml | | B60N 2/502 297/338 |
| 2011/0024601 A1* | 2/2011 | Shoemaker | | B60N 2/501 248/636 |
| 2011/0024958 A1* | 2/2011 | Deml | | B60N 2/502 267/131 |
| 2012/0001467 A1* | 1/2012 | Teufel | | B60N 2/0232 297/337 |
| 2012/0001468 A1* | 1/2012 | Schuler | | B60N 2/502 297/344.16 |
| 2012/0090930 A1* | 4/2012 | Haller | | B60N 2/502 188/280 |
| 2012/0097822 A1* | 4/2012 | Hammarskiold | | B60N 2/502 248/421 |
| 2013/0153320 A1* | 6/2013 | Contratto | | B60N 2/501 180/89.1 |
| 2013/0158791 A1* | 6/2013 | Contratto | | B60N 2/501 701/36 |
| 2013/0168624 A1* | 7/2013 | Shin | | B60N 2/502 254/93 R |
| 2013/0206949 A1* | 8/2013 | Archambault | | B60N 2/508 248/421 |
| 2013/0264455 A1* | 10/2013 | Robbins | | F16F 15/022 248/564 |
| 2014/0299434 A1 | 10/2014 | Lull et al. | | |
| 2015/0021965 A1* | 1/2015 | Ellerich | | B60N 2/682 297/283.1 |
| 2015/0158404 A1* | 6/2015 | Pylypenko | | B60N 2/525 248/575 |
| 2015/0232004 A1* | 8/2015 | Haller | | B60N 2/501 248/562 |
| 2015/0232005 A1* | 8/2015 | Haller | | B60N 2/505 248/562 |
| 2016/0200230 A1* | 7/2016 | Haller | | B60N 2/501 296/190.08 |
| 2016/0207430 A1* | 7/2016 | Haller | | B60N 2/501 |
| 2016/0214658 A1* | 7/2016 | Haller | | B60N 2/501 |
| 2018/0072189 A1* | 3/2018 | Plante | | B62D 5/0478 |

FOREIGN PATENT DOCUMENTS

| | | | |
|---|---|---|---|
| EP | 1 321 321 A2 | 6/2003 | |
| GB | 2052961 A * | 2/1981 | ............ B60N 2/502 |
| WO | WO-8809270 A1 * | 12/1988 | ............ B60N 2/501 |
| WO | 2016187719 A1 | 1/2016 | |

\* cited by examiner

DYNAMIC MOTION CONTROL SYSTEM USING MAGNETORHEOLOGICAL FLUID CLUTCH APPARATUSES

CROSS-REFERENCE OF RELATED APPLICATIONS

The present application is a continuation-in-part of International patent application No. PCT/CA2016/050598 filed on May 26, 2016 which claims priority on U.S. provisional patent application No. 62/166,400 filed on May 26, 2015 and U.S. provisional patent application No. 62/185,254 filed on Jun. 26, 2015, incorporated herewith by reference.

TECHNICAL FIELD

The present application relates generally to magnetorheological (MR) fluid clutch apparatuses, and more particularly, to bodies using such apparatuses for dynamic control of motion in active motion control or suspension systems.

BACKGROUND OF THE ART

A body, such as a vehicle, moving in a desired direction inevitably experiences motion in other directions as well. This undesired motion often arises from disturbances in the medium through which the body travels. For example, in a vehicle, whether one travels by land, sea, or air, one might encounter imperfections, bumps, waves, air pockets, and the like. At best, such random acceleration causes displacement, discomfort or annoyance to those in the body. This can also cause vibration and undesired horizontal or vertical movement to goods in the body. For certain susceptible individuals, these random accelerations can trigger a bout of motion sickness. However, in some cases, a particularly violent acceleration will cause the operator to briefly lose control of the body. Also, goods can be damaged when submitted to acceleration or shocks. Even when stationary, there may be some residual vibration associated with the vehicle's engine. In motion, even on smooth roads, this residual vibration can become tiresome.

A primary purpose of a body's suspension system is to provide vertical or horizontal compliance between the medium, such as the road, and the chassis, in order to isolate the chassis occupants or goods from the roughness in the road and to maintain the contact point(s) with the road, thus providing a path for transferring forces from the contact point(s) to the chassis. In applications where the body is a wheeled body, the contact point is also used to change the speed or direction of the body. In a wheeled body, examples of some common independent suspension linkages are known generally as strut & link (also called MacPherson strut), double A-arm (also called double wishbone or SLA), trailing arm, semi-trailing arm, multi-link, fork, scissor, pivot to name but a few.

In vehicles such as automobiles, each wheel assembly is connected to the chassis by one or more links. A link is defined as a substantially rigid member with a joint or joints at each end that allows a particular motion to take place. It is these links that control the motion (or path) of the wheel as it moves up and down over road bumps. These links also have to transmit the forces generated at the tire-road interface to the chassis. Rubber bushings are typically used at the ends of links to reduce the transmission of vibrations to the chassis. Unfortunately, the use of bushings also introduces compliance into the linkage that can be undesirable for accurately controlling wheel motion.

In an active suspension, controlled forces are introduced in the suspension, such as by hydraulic or electric actuators, between the sprung mass of the vehicle body and its occupants, and the unsprung mass of the wheel assemblies. The unsprung mass is the equivalent mass that reproduces the inertial forces produced by the motions of those parts of the vehicle not carried by the suspension system. This primarily includes the wheel assemblies, any mass dampers associated with the wheel assemblies, and some portion of the mass of the suspension links. The sprung mass is the mass of those parts of the vehicle carried by the suspension system, including the body. Active suspension systems may introduce forces that are independent of relative wheel motions and velocities.

Generally, all kinematically-induced wheel forces are either forces created by the interaction between the tires and the road, or inertial forces generated by the motion of the unsprung mass. The forces occurring between the tires and the road are transferred via the suspension system to the body. As long as the wheel assembly does not change its horizontal position or angular orientation relative to a smooth road surface, no substantial lateral or longitudinal tire forces (ignoring friction) will be created.

The tread width for a given pair of wheels is defined as the lateral distance between the centers of tire contact points with the road. When wheels bounce and rebound on most independent suspensions for passenger cars, the tread width changes. Solid axle suspensions (generally not favored due to ride quality and weight issues) and full trailing arm suspensions (generally considered only for rear suspensions on straight line racing vehicles, such as for drag racing), are generally immune from tread width changes. On commonly used passenger vehicle independent suspensions, such as the strut and SLA suspensions, the rather short suspension links pivot about fixed points or axes on the body, inboard of the wheel assemblies. The outer ends of the links (attached to the wheel assemblies) are therefore constrained to move in a substantially circular path with respect to the body, as viewed from either end of the vehicle. This link motion alters the position of the bottom of the tire relative to the body, changing the overall tread width.

Tread width change creates lateral forces, higher rolling resistance, and deterioration in directional stability of the vehicle. Conventional passenger cars typically have tread widths that widen with jounce travel and narrow during rebound. When a bump compresses both wheels of an independent axle simultaneously, the lateral forces applied to the vehicle body by lateral movement of one wheel tend to be balanced by lateral forces from the other wheel. Unfortunately, bumps seldom generate equal jounce and rebound on both sides of the vehicle simultaneously, and unequal wheel motions result in net lateral forces being applied to the vehicle body from tread width changes.

As undesirable as tread width change can be, configuring a conventional suspension to geometrically eliminate tread width changes tends to create unacceptable levels of roll during cornering, due to positioning of the theoretical "roll centers" of the front and rear suspensions. An excessive amount of roll is uncomfortable to the driver and passengers, can adversely affect tire grip, and uses up valuable suspension travel needed to avoid bottoming of the suspension on bumpy corners. The suspension roll center is a theoretical point in the center of the vehicle (viewed from the front) and in the center of the axle (viewed from the side) around which the vehicle body will rotate when subject to centrifugal force. It is also the point at which lateral forces can be viewed as effectively applied to the sprung body mass by the suspension. Therefore, the tendency for the vehicle body to roll is proportional to the distance between the roll center and the center of gravity of the body, and the optimum position of the roll center to minimize roll is at the height of the center of gravity of the sprung mass. However, the higher the roll center, the larger the tread width change. With the roll center above ground level, tread width will increase during jounce and decrease on rebound. It will be understood that the location of the roll center constantly changes with suspension position.

Wheel camber is another variable for tuning the characteristics of a vehicle suspension. Camber is the angle between the wheel center plane and a vertical to the plane of the road. Camber is positive when the top of the tire is inclined outwards away from the center of the vehicle, and negative when inclined inwards. When a vehicle is loaded to its design weight, a slightly positive camber value of, for example, 0.1 degree is considered ideal to keep the tires as upright as possible on the crowned road surface, for low rolling resistance and uniform tire wear. Many passenger car suspensions employ a static camber setting between about zero and negative 1.3 degrees, and effect dynamic camber change through selective suspension compliance, to offset negative static camber to try to provide a nearly zero camber on the outside tires in cornering. Some have said that keeping the camber near zero under all conditions is a primary goal of modern suspension systems, perhaps because tires are all designed to operate at a particular camber angle for optimum grip, and even small deviation from that angle can reduce tire grip capability.

When a vehicle with independent suspension is cornering, the wheels tend to tilt with the body. Thus, as the car body rolls toward the outside of the bend, the outside wheel goes into positive camber relative to the road, reducing its lateral grip. To combat this effect, many suspension linkages are designed to geometrically induce negative camber in jounce and positive camber as they rebound, even though such geometric camber adjustments will cause camber shifts during bumps as well as during cornering.

Cars with relatively soft suspensions will tend to pitch during braking and acceleration, dipping at the front and rising at the rear under heavy braking, and the opposite during hard acceleration. This pitching motion tends to put more strain on the neck muscles of the vehicle occupants than during simple linear acceleration and deceleration without such body rotation. Also, pitching motions are perceived to be objectionable by many passengers. Many suspensions incorporate anti-dive (to reduce forward pitching during braking) and anti-squat (to reduce rearward pitching during acceleration) configurations to reduce this effect.

An example of a simple anti-dive design is the use of a leading arm in the front suspension and a trailing arm in the rear suspension. With a leading arm, the effective arm pivot at the body is rearward of the effective arm pivot at the wheel. The relative locations of the effective pivots are reversed for a trailing arm. Under braking action, the calipers tend to rotate with the wheel producing an upward reaction at the front of the body and a downward force at the rear, producing an anti-dive effect. Traditional suspension linkages, like the double wishbone, can be designed with the wishbones pivot axes angled to give an effective leading arm length. However, such arrangements tend to induce undesirable wheel caster angle changes during jounce and rebound. Therefore, some manufacturers compromise by correcting only a percentage (typically, about 50 percent) of the brake live. Furthermore, an anti-dive geometry carefully calculated to match a particular front/rear brake force distribution will seldom give the perfect correction for anti-squat.

Improvements in suspension configuration are generally needed, particularly for use with active suspension control means.

Roll bars for motor vehicles are usually used to elastically couple the wheel suspension of a wheel on one side of the motor vehicle with the wheel suspension of the corresponding wheel of the same axle on the other side of the motor vehicle. The coupling is performed such that when one wheel is deflected inwardly, the spring action of the other wheel is also acted on in the direction of inward deflection. As a result, the lateral slope of the motor vehicle toward the outside of the curve is reduced during the travel of the motor vehicle in a curve, partly because the wheel suspension of the particular wheel that is the outer wheel in the curve is additionally supported by the spring system of the wheel suspension of the wheel that is the inner wheel in the curve and partly because the wheel suspension of the wheel that is the inner wheel in the curve is forced somewhat in the direction of inward deflection relative to the chassis of the vehicle.

By contrast, the roll bar shall not possibly affect the spring action characteristics of the vehicle during straight-line travel.

However, if the pavement is so uneven that one wheel on one side of the vehicle is forced in the inward deflection direction, while the corresponding wheel on the other side of the vehicle must be moved in the outward deflection direction to maintain the desired road contact, the driving smoothness is compromised by a roll bar, because the roll bar tends to counteract mutually opposite movements of the wheel suspensions coupled by the roll bar relative to the vehicle body. Thus, during straight-line travel, a roll bar may undesirably cause vibrations of one wheel to be transmitted to the opposite wheel of the same axle, which compromises the driving smoothness.

This contradiction between the safety and comfort requirements imposed on a roll bar can be eliminated if the roll bar is switched off during straight-line travel and is again switched on automatically during travel in a curve. Further improvement can be done if the roll bar can actively control the elastic coupling between the wheels.

The drawback of the prior-art roll bars with active torsion bar is that the switching on (coupling) of the roll bar during travel in a curve must take place, in general, automatically and very rapidly for safety reasons, because the vehicle could otherwise become uncontrollable in the curve. The high costs of the prior-art rollbars which are associated with these requirements on the actuator have caused that switch-on roll bars (also known under the name "active roll bars") are not used in models manufactured in large series (i.e., in vehicles manufactured in large numbers).

Dynamic vibration control can also be beneficial with hand-held power tools with an impact drive in particular, such as rotary hammers, chisel hammers, and the like, where the hand-held power tool may be subjected to considerable vibrations. When these vibrations are transferred to a handle that is used to press the hand-held power tool against a work piece, the operator perceives the vibrations to be uncomfortable, and long-term exposure thereto may even result in injury. For this reason, double-shelled housings, with which the entire hammer is suspended in an outer shell such that it is resilient in its working direction, have usually been used to provide linear vibration damping of rotary hammers. This design is relatively expensive and do not reduce the vibration to a comfortable level.

Based thereon, one object of the present invention is to improve a hand-held power tool of the type described initially such that the amount of vibration on a handle that is decoupled from the tool is significantly reduced by the use of a MR fluid actuator unit.

SUMMARY

It is an aim of the present disclosure to provide novel active motion control systems using magnetorheological fluid clutch apparatuses.

It is a further aim of the present disclosure to provide novel active suspension control systems using magnetorheological fluid clutch apparatuses.

It is a still further aim of the present disclosure to use such systems in passenger vehicles.

Therefore, in accordance with a first embodiment of the present disclosure, there is provided an active suspension system comprising: at least one biasing device configured to support a body from a structure; at least one motor; at least one magnetorheological (MR) fluid clutch apparatus coupled to the at least one motor to receive torque from the motor, the MR fluid clutch apparatus controllable to transmit a variable amount of torque; a mechanism between the at least one MR fluid clutch apparatus and the body to convert the torque received from the at least one MR fluid clutch apparatus into a force on the body; at least one sensor for providing information indicative of a state of the body or structure; and a controller for receiving the information indicative of the state of the body or structure and for outputting a signal to control the at least one MR fluid clutch apparatus in exerting a desired force on the body to control movement of the body according to a desired movement behavior.

Still further in accordance with the first embodiment, two of the at least one MR fluid clutch apparatus receive torque from the at least one motor, the two MR fluid clutch apparatuses outputting torque in opposite directions to cause a reciprocating movement of the body via the mechanism.

Still further in accordance with the first embodiment, a transmission couples the at least one motor to the at least one MR fluid clutch apparatus.

Still further in accordance with the first embodiment, the mechanism includes links pivotally interconnected.

Still further in accordance with the first embodiment, the mechanism includes gears.

Still further in accordance with the first embodiment, the mechanism includes a hydraulic network.

In accordance with a second embodiment, there is provided a vehicle comprising: at least one active suspension system as described above, wherein the structure is a chassis of the vehicle, and wherein the body is at least one seat.

In accordance with a third embodiment, there is provided a vehicle comprising: at least one active suspension system as described above, wherein the structure is a chassis of the vehicle, and wherein the body is a wheel assembly of the vehicle, the wheel assembly being connected to the chassis by a linkage.

Still further in accordance with the third embodiment, the linkage is displaceable in translation, the mechanism being coupled to the linkage for the at least one MR fluid clutch apparatus to exert the desired force to displaceable the linkage in translation.

Still further in accordance with the third embodiment, the at least one biasing device is a coil spring enclosing the linkage to bias the wheel assembly downwardly.

Still further in accordance with the third embodiment, the mechanism is a ballscrew device and the linkage is a threaded rod.

Still further in accordance with the third embodiment, there is provided one said active suspension system for one of the wheel assemblies on a first side of the vehicle, and comprising another one of said active suspension system for one of the wheel assemblies on a second side of the vehicle, the active suspension system being selectively independent from one another, for at least one of the front wheel assemblies and the rear wheel assemblies of the vehicle.

Still further in accordance with the third embodiment, the mechanism includes a hydraulic network comprising at least one hydraulic conduit between the MR fluid clutch apparatus to adjust a length of the linkage in at least one direction.

Still further in accordance with the third embodiment, the hydraulic network comprises a biased piston system in fluid communication with the hydraulic conduit to maintain a fluid pressure in the hydraulic conduit via a biasing of the piston.

Still further in accordance with the third embodiment, the biased piston system is located distally from the wheel assembly.

Still further in accordance with the third embodiment, the hydraulic network comprises two of the hydraulic conduit to adjust a length of the linkage in two directions.

Still further in accordance with the third embodiment, a first of the two hydraulic conduits is connected to the linkage via the biased piston system, and a second of the two hydraulic conduits is directly connected to the linkage.

Still further in accordance with the third embodiment, the mechanism is a roll bar having a first end coupled to the MR fluid clutch apparatus, and a second end coupled to the wheel assembly.

In accordance with a fifth embodiment of the present disclosure, there is provided a power tool comprising: at least one active suspension system as described above, wherein the structure or body supports a power source and tool, and wherein the body is a handle, the mechanism being a joint between the at least one MR fluid clutch apparatus and the handle or body.

In accordance with a fifth embodiment of the present disclosure, there is provided an active platform system comprising: at least one platform; at least a pair of linkages supporting the platform to the ground, such that the platform is displaceable relative to the ground; at least one active suspension system including at least one motor, at least one magnetorheological (MR) fluid clutch apparatus for each said linkage, the MR fluid clutch apparatus coupled to the at least one motor to receive torque from the motor, the MR fluid clutch apparatus controllable to transmit a variable amount of torque, a mechanism between each said the at least one MR fluid clutch apparatus and corresponding linkage to convert the torque received from the at least one MR fluid clutch apparatus into a force on the linkage, and a controller for receiving information indicative of position of the platform and for outputting a signal to control the at least one MR fluid clutch apparatus in exerting a desired force on the linkage to displace the platform.

Further in accordance with the fifth embodiment, a single one of the motor is provided for a plurality of the platforms.

Still further in accordance with the fifth embodiment, the at least one platform is connected to the ground by two said linkages receiving an actuation from a corresponding one said MR fluid clutch apparatus, and a static linkage.

Still further in accordance with the fifth embodiment, the at least one platform is connected to the ground by at least three said linkages receiving an actuation from a corresponding one said MR fluid clutch apparatus.

In accordance with a sixth embodiment of the present disclosure, there is provided a vehicle comprising: a chassis; wheel assemblies, at least a pair of said wheel assembly being connected to the chassis by a respective linkage associated with a wheel position or orientation; a steering system mounted to the chassis and connected to the respective linkages; an active control system including a motor, at least one magnetorheological (MR) fluid clutch apparatus coupled to the at least one motor to receive torque from the motor, the MR fluid clutch apparatus controllable to transmit a variable amount of torque; a mechanism between the at least one MR fluid clutch apparatus and at least one said respective linkage to convert the torque received from the at least one MR fluid clutch apparatus into a force on the linkage, at least one sensor for providing information indicative of a state of the vehicle, and a controller for receiving the information indicative of the state of the vehicle and for outputting a signal to control the at least one MR fluid clutch apparatus in exerting a desired force on the linkage to adjust the wheel position or orientation independently of a steering input.

Further in accordance with the sixth embodiment, the respective linkage is displaceable in translation, the mechanism being coupled to the linkage for the at least one MR fluid clutch apparatus to exert the desired force to displaceable the linkage in translation.

Still further in accordance with the sixth embodiment, one said active control system for one of the wheel assemblies on a first side of the vehicle, and comprising another one of said active control system for one of the wheel assemblies on a second side of the vehicle, the active control system being selectively independent from one another, for at least one of the front wheel assemblies and the rear wheel assemblies of the vehicle.

Still further in accordance with the sixth embodiment, the mechanism includes a hydraulic network comprising at least one hydraulic conduit between the MR fluid clutch apparatus to adjust a length of the respective linkage in at least one direction.

Still further in accordance with the sixth embodiment, the hydraulic network comprises a biased piston system in fluid communication with the hydraulic conduit to maintain a fluid pressure in the hydraulic conduit via a basing of the piston.

Still further in accordance with the sixth embodiment, the biased piston system is located distally from the wheel assembly.

Still further in accordance with the sixth embodiment, the hydraulic network comprises two of the hydraulic conduit to adjust a length of the linkage in two directions.

Still further in accordance with the sixth embodiment, a first of the two hydraulic conduits is connected to the linkage via the biased piston system, and a second of the two hydraulic conduits is directly connected to the linkage.

In accordance with a seventh embodiment of the present disclosure, there is provided An active suspension system comprising: a platform; a support mechanism to support the platform, the support mechanism providing at least one degree of freedom (DOF) to allow a vertical adjustment of the platform; at least one motor; at least one magnetorheological (MR) fluid clutch apparatus coupled to the at least one motor to receive torque from the motor, the MR fluid clutch apparatus controllable to transmit a variable amount of torque; and a transmission between the at least one MR fluid clutch apparatus and the support mechanism or platform to convert the torque received from the at least one MR fluid clutch apparatus into a force to move the platform in at least one direction of the DOF.

DETAILED DESCRIPTION

Figure 1:
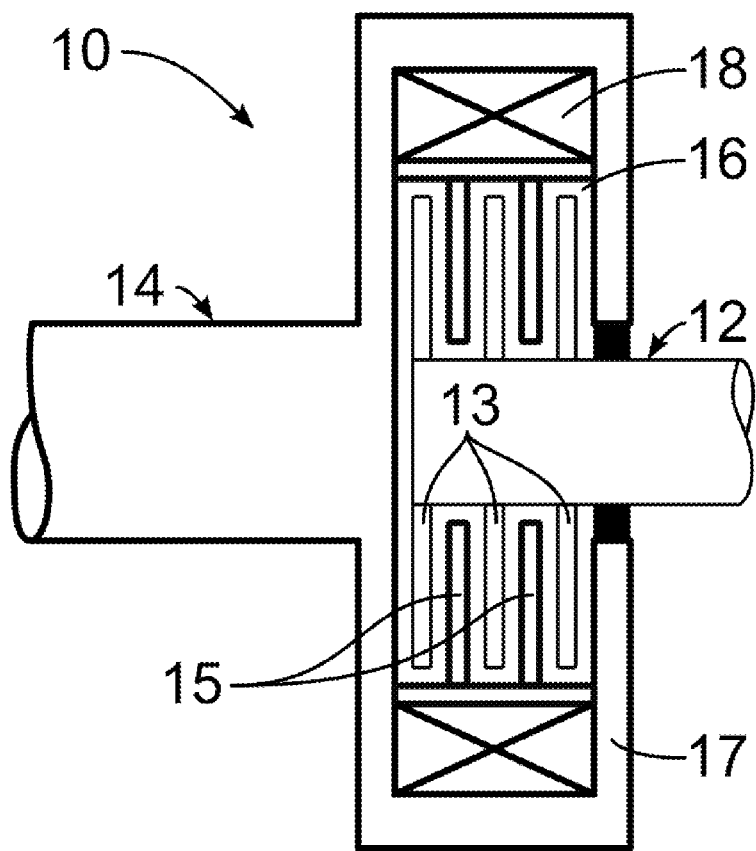
FIG. 1 is a schematic view of a magnetorheological fluid clutch apparatus used in systems of the present disclosure.

Referring to the drawings and more particularly to FIG. 1, there is illustrated a generic magnetorheological (MR) fluid clutch apparatus 10 configured to provide a mechanical output force based on a received input current. The MR fluid clutch apparatus 10 of FIG. 1 is a simplified representation of a MR fluid clutch apparatus that may be used in the systems described hereinafter. The MR fluid clutch apparatus that is used in the systems described hereinafter may have additional components and features, such as drums, redundant electromagnets, MR fluid expansion systems, etc. In particular, the MR fluid clutch apparatus 10 may be part of an MR fluid actuator unit 11 (FIG. 21), described hereinafter.

The MR fluid clutch apparatus 10 has a driving member 12 with radial disks 13, this assembly also known as input rotor. The MR fluid clutch apparatus 10 also has a driven member 14 with annular plates 15 intertwined with the radial disks 13 to define an annular chamber(s) filled with an MR fluid 16, the annular chamber being delimited by a casing 17 that is integral to the driven member 14. The assembly of the driven member 14 and annular plates 15 is also known as the output rotor. In the example of FIG. 1, the driving member 12 may be an input shaft in mechanical communication with a power input, and driven member 14 may be in mechanical communication with a power output (i.e., force output, torque output). MR fluid 16 is a type of smart fluid that is composed of magnetisable particles disposed in a carrier fluid, usually a type of oil. MR fluid may also be composed of magnetisable particles only, without fluid. When subjected to a magnetic field, the fluid may increase its apparent viscosity, potentially to the point of becoming a viscoplastic solid. The apparent viscosity is defined by the ratio between the operating shear stress and the operating shear rate of the MR fluid comprised between opposite shear surfaces—i.e., that of the radial disks 13 on the drive side, and that of the annular plates 15 and of the walls of the casing 17 in the annular chamber 17. The magnetic field intensity mainly affects the yield shear stress of the MR fluid. The yield shear stress of the fluid when in its active ("on") state may be controlled by varying the magnetic field intensity produced by electromagnet 18 integrated in the casing 17, i.e., the input current, via the use of a controller. Accordingly, the MR fluid's ability to transmit force can be controlled with the electromagnet 18, thereby acting as a clutch between the members 12 and 14. The electromagnet 18 is configured to vary the strength of the magnetic field such that the friction between the members 12 and 14 is low enough to allow the driving member 12 to freely rotate with the driven member 14 and vice versa.

Figure 21:
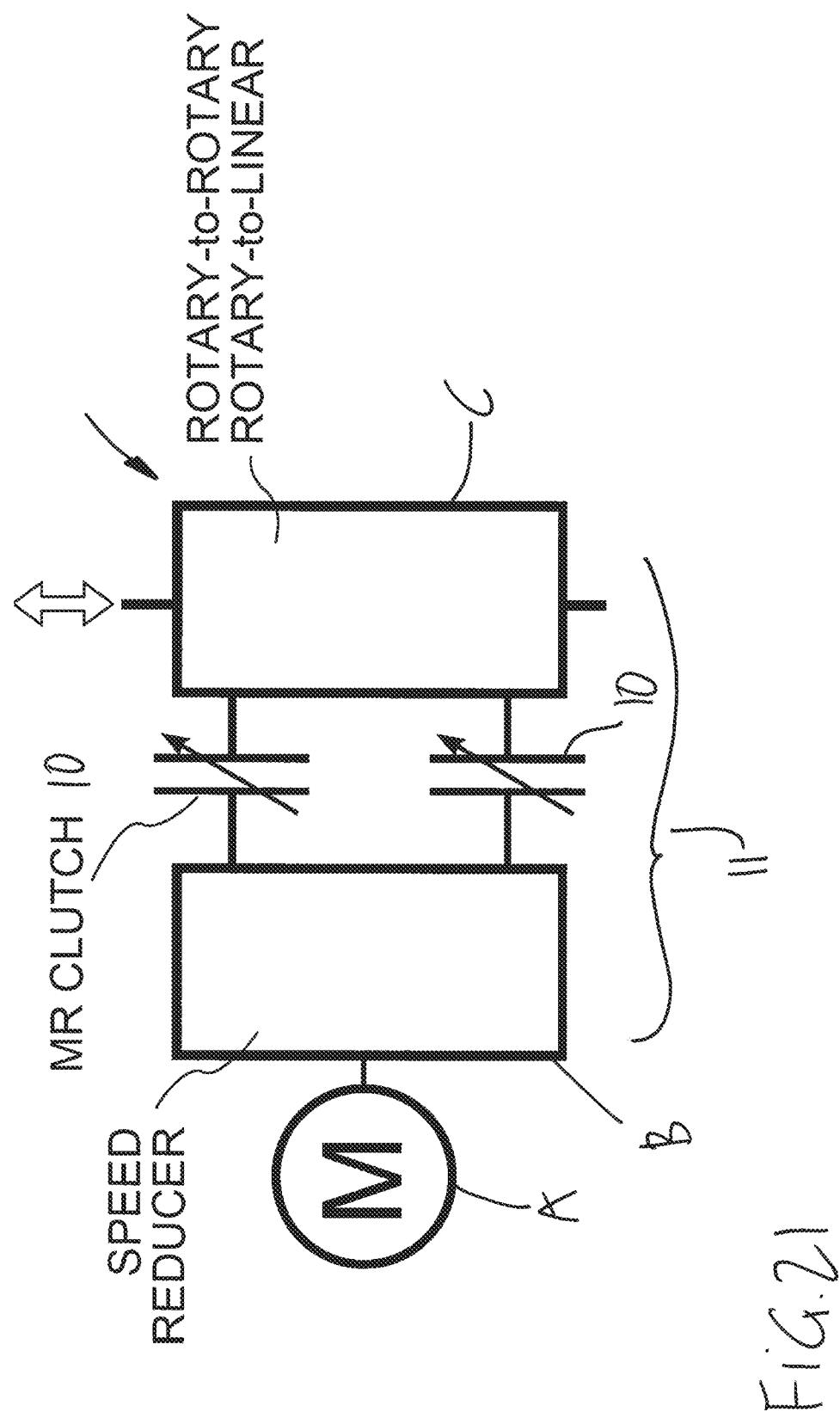
FIG. 21 is a schematic view of an MR fluid actuator unit using one or more of the MR fluid clutch apparatus of FIG. 1.

Referring to FIG. 21, the MR fluid actuator unit 11 is generally shown as being constituted of a power source A (e.g., a motor), a speed reducer B, at least one of the MR fluid clutch apparatuses 10 and an output device C or mechanism. The output device C may be a rotary-to-rotary device, or a rotary-to-linear device. In FIG. 21, the MR fluid actuator unit 11 has two MR fluid clutch apparatuses 10. Alternatively, it is contemplated to have a single MR fluid clutch apparatus 10, with a biasing member or like force-applying member providing an antagonistic force to enable a bi-directional output for the MR fluid actuator unit 11.

Figure 2:
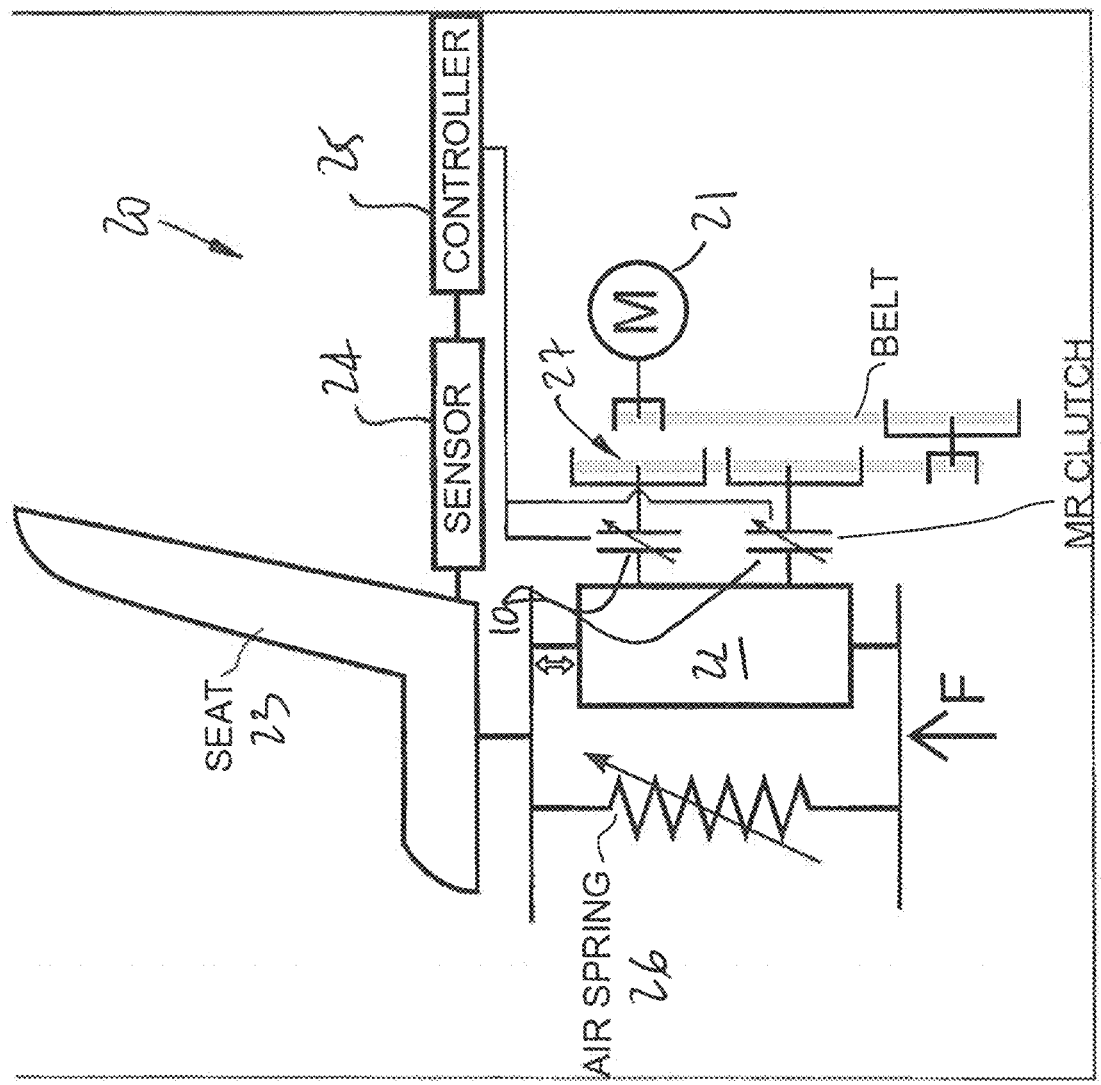
FIG. 2 is a schematic view of an active suspension system using MR fluid clutch apparatuses as in FIG. 1, for a seat platform.

According to FIG. 2, an active suspension system is generally shown at 20 comprising MR fluid clutch apparatuses 10 of the type described above. The suspension is said to be "active", in that it applies forces to a platform by a controlled actuator. Such forces may be independent of relative motions and velocities in the environment of or at a suspended platform. The active suspension system 20 has or receives actuation from a power source 21 such as a motor. The active suspension system 20 has a mechanism, in the form of linkage 22, coupled to platform 23 (e.g., seat, pallet, stretcher, truck cabin, transportation box, only to name a few) for transmitting motion output by the MR fluid clutch apparatuses 10 to the platform 23, each MR fluid clutch apparatuses 10 outputting rotations in opposite directions. A sensor or sensors 24 provides information indicative of a state of the platform 23, and a controller 25 receives the information indicative of the state of the platform 23 and outputs a signal to the MR fluid clutch apparatuses 10 to cause the MR fluid clutch apparatus(es) 10 to exert a force on the suspended platform 23. Alternatively, the sensor(s) 24 may be on the structure supporting the platform 23, and/or on components of the active suspension system, to measure the state of any such component. Additional components may be provided, such as an air spring 26 or like biasing device, in parallel to the linkage 22. It is to be noted that for a reason of simplicity, the explanation is described with the control of one degree of freedom but that multiple actuators could be used to control multiple degrees of freedom of the body. Moreover, the multiple MR fluid clutch apparatuses could share the same power source, as is the case in FIG. 2 with both MR fluid clutch apparatuses 10 receiving the actuation power from the single motor 21, via a transmission 27. The transmission 27 is illustrated as featuring pulleys and belts, but may be of other type such as a gearbox, chain and pinions, etc. Other devices can be used as variable force sources as alternatives to the air spring.

The combination of a variable power source with the MR fluid clutch apparatus(es) 10 presents advantages of a hybrid system where one device or the other (or both simultaneously) can be controlled depending on the condition of operation. In an example where the power source is an electric motor, the electric motor speed and available torque can be controlled as well as the torque transmitted by the MR fluid clutch apparatus(es) 10. This may increase the potential points of operation while increasing the overall performance or efficiency of the system. The output of the MR clutches can be decoupled from the input. In some application, this can be useful to decouple the inertia from the input in order not to affect the time of response of the output.

Figure 3A:
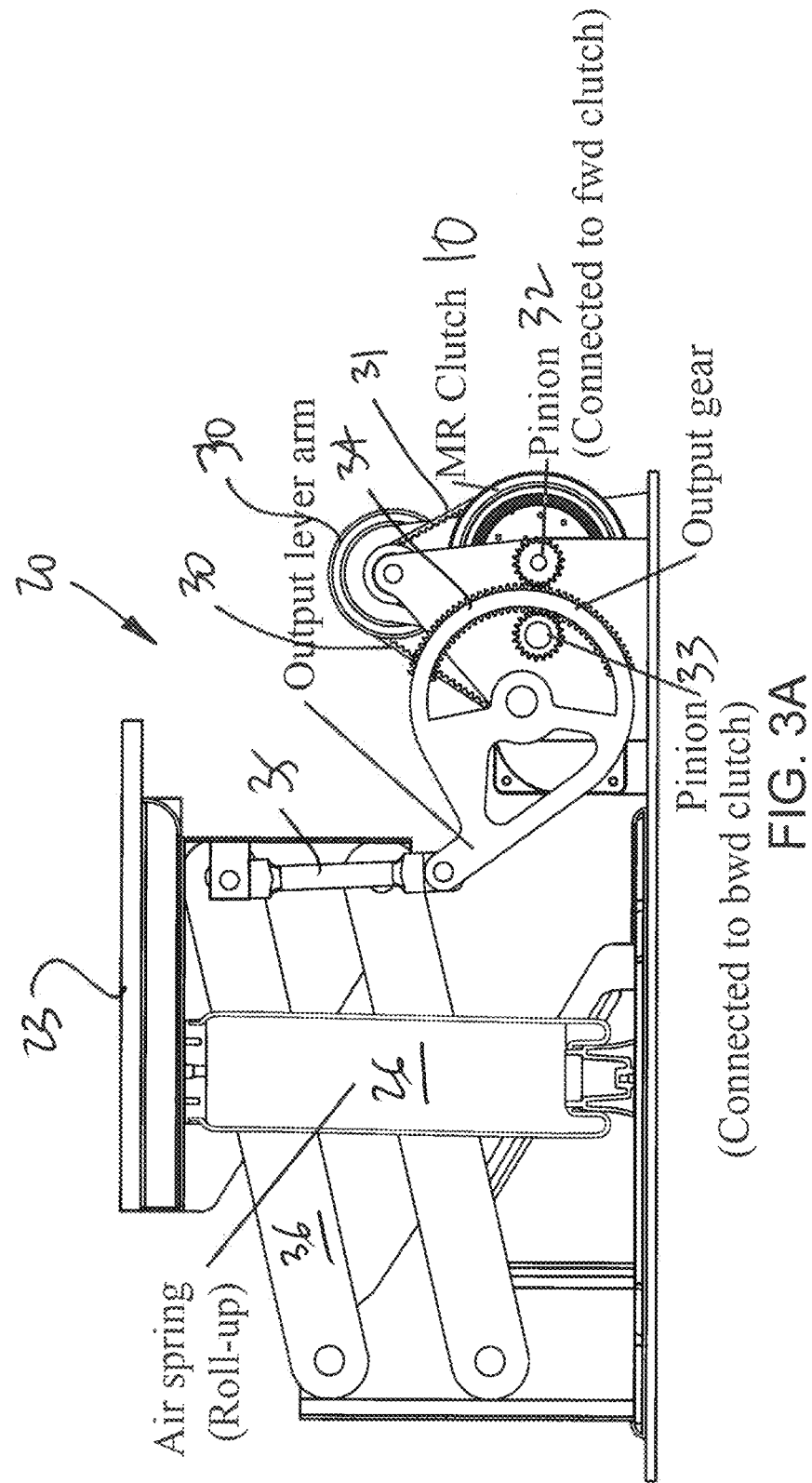
FIG. 3A is an exemplary side view of a geared implementation of the active suspension system of FIG. 2.
Figure 3B:
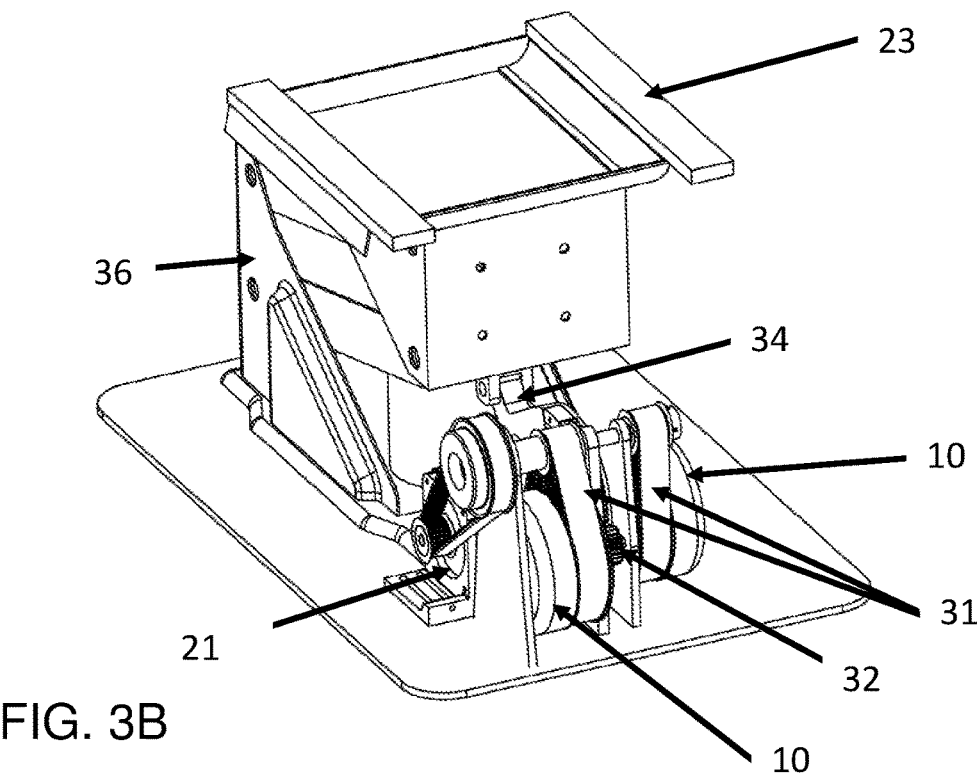
FIG. 3B is a perspective view of the geared implementation of the active suspension system of FIG. 3, as raised.
Figure 3C:
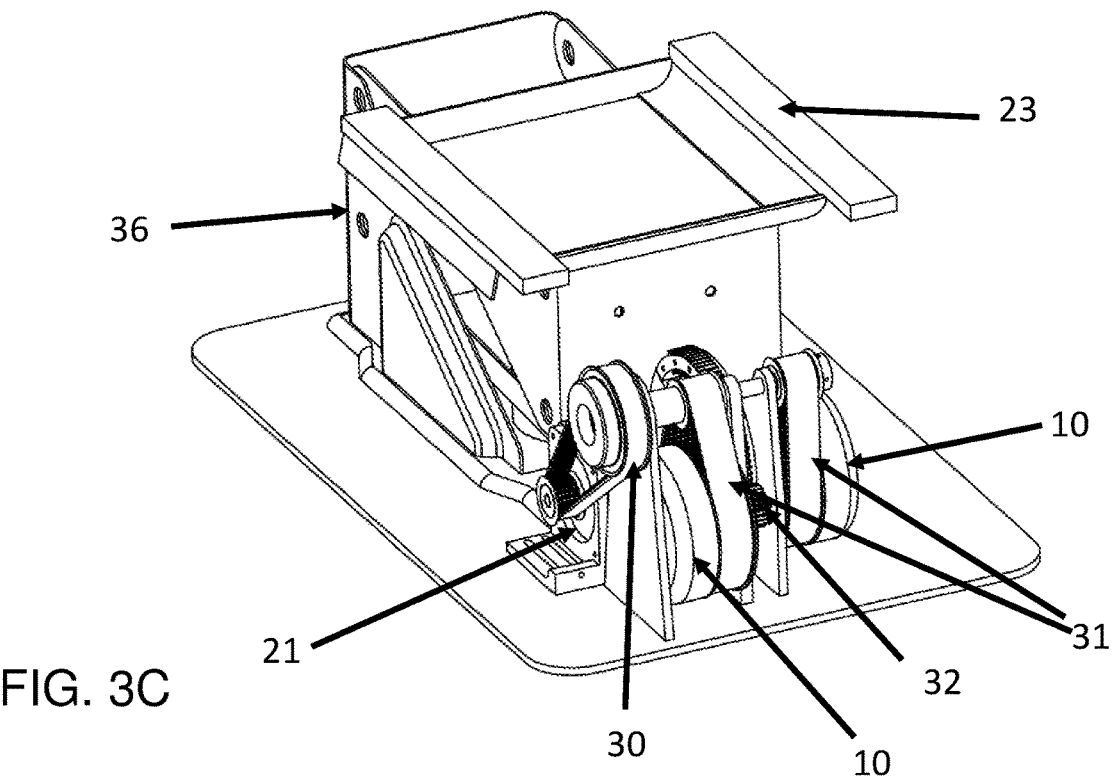
FIG. 3C is a perspective view of the geared of the active suspension system of FIG. 3, as lowered.

FIGS. 3A-3C are representative of an implementation of the system 20 of FIG. 2, whereby like reference numerals will indicate like components. In the embodiment of the system 20 of FIGS. 3A-3C, reduction stages 30 and 31, i.e., the transmission, consisting of belts and pulleys, are provided between the motor 21 and the MR fluid clutch apparatuses 10, to reduce the rotational speed of the motor output and increase the available torque. The mechanism 22 includes pinions 32 and 33, one of which is connected to the MR fluid clutch apparatus 10 providing clockwise rotation of output gear 34 of the mechanism 22, and another being connected to the MR fluid clutch apparatus 10 providing counterclockwise rotation of output gear 34. Accordingly, output gear 34, also part of the linkage or mechanism 22, may rotate in both directions, and has an output arm 35, with pivot ends, that converts the rotations transmitted by the MR fluid clutch apparatuses 10 in up or down movements, at least. The linkage 22 may further comprise a support mechanism having a base interfaced to a ground or vehicle chassis, with the platform 23 interfaced to a seat. The displacement of the support mechanism 36 is actuated by the arrangement of MR fluid clutch apparatuses 10 described above. Although not shown, sensors 24 and a controller 25 respectively gather information indicative of a state of the platform 23, of the structure supporting the platform 23 and/or components of the active suspension system 20, and outputs a signal to the MR fluid clutch apparatuses 10 based on the state. For example, the controller 25 may be programmed with a desired behavior for the platform 23. The desired behavior may be a comfort behavior, in which the platform 23 must not be exposed to accelerations beyond a given level, in a particular direction (e.g., up and down). Therefore, the controller 25 will control the action of the MR fluid clutch apparatus(es) 10 to ensure that the platform 23 moves within the limits of the desired behavior, in spite of disturbances sustained by the structure (e.g., vehicle chassis). Likewise, the desired behavior could be a control behavior entailing that the platform 23 limits its span of movements in some controllable directions. Therefore, the active suspension system 20, and other embodiments of suspension described below, adopt an active control in that force is applied to control the movement behavior of an item, such as a passenger supporting platform or a wheel assembly, to name but a few examples.

Figure 4A:
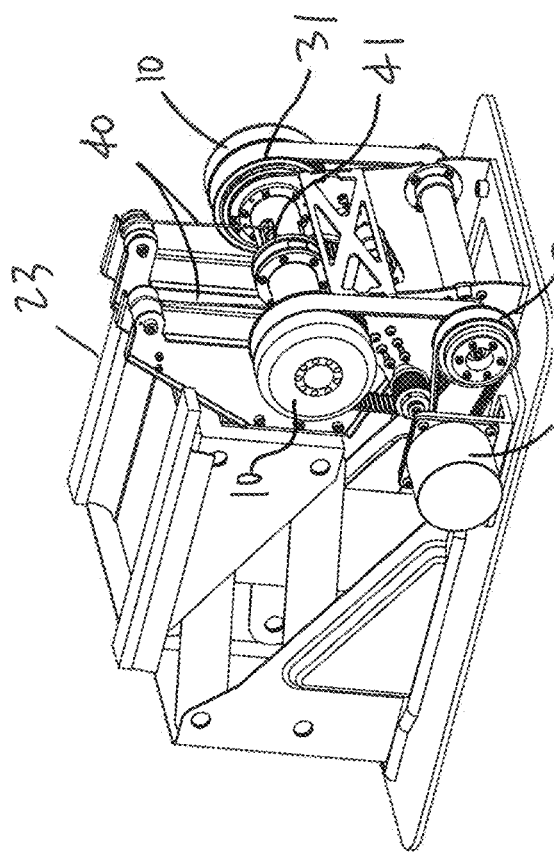
FIG. 4A is a perspective view of a cabled implementation of the active suspension system of FIG. 3, as raised.
Figure 4B:
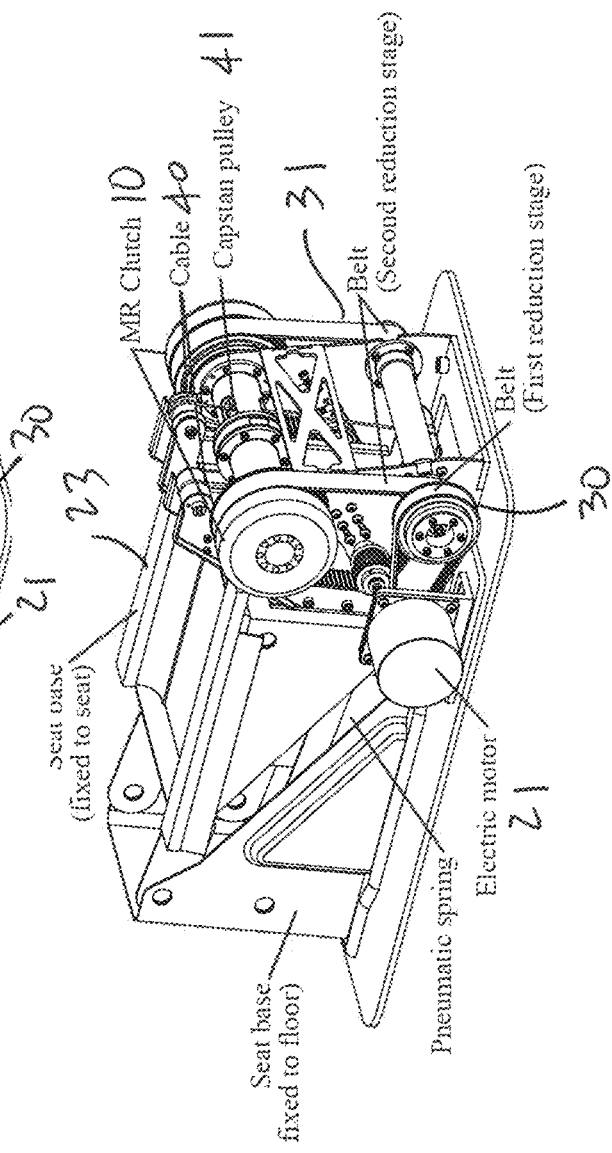
FIG. 4B is a perspective view of the cabled implementation of the active suspension system of FIG. 3, as lowered.

FIGS. 4A-4B are representative of an implementation of the system 20 of FIGS. 2 and 3A-30, whereby like reference numerals will indicate like components. The mechanism 22, instead of relying on rigid links, pinions and gear, relies on cables or tendons 40 and capstans or pulleys 41 providing antagonistic forces to maintain the platform 23 in the desired state. In this implementation, the two MR fluid clutch apparatuses 10 turn in the same direction. The antagonist effect is obtained by one MR fluid clutch apparatus 10 pulling a point of the platform 23 higher than the other MR fluid clutch apparatus 10, the other MR fluid clutch apparatus 10 pulling a point on the platform 23 lower than the first MR fluid clutch apparatus 10. It is to be noted that the same effect may be obtained by using pulleys and by having both MR fluid clutch apparatuses 10 lower or higher than the mounting point on the platform 23.

The MR fluid clutch apparatus 10 of FIG. 1 may be used in various wheel suspensions for suspending a wheel assembly from a sprung body of a wheeled vehicle. The MR fluid clutch apparatus 10 allows the wheel assembly to move relative to the sprung body through a bounce and rebound vertical travel, as limited by mechanical stops. The wheel assembly may be the rear wheel assembly or the front wheel assembly of a passenger vehicle such as an automobile, a front or rear wheel assembly of a motorcycle, the front or rear wheel assembly of a transportation cart, only to name a few. In some configurations, the relative rotational centers are disposed rearward and outboard of their respective pivots.

In some cases, the upper relative rotation center and upper pivot are disposed along a first generally horizontal line, and the lower relative rotation center and lower pivot are disposed along a second generally horizontal line, with the automobile at rest and loaded to its design weight. The upper and lower rotation centers are preferably separated from their respective pivots by different arm lengths. The term "design weight" should be understood from ISO/IS 2958, which specifies the loading for passenger vehicles as a function of the number of seats. Typically, the suspension is roughly at the center of its vertical travel at rest at the design weight. In some embodiments, the active suspension system includes an electric motor adapted to receive electrical power, coupled with one of more of the MR fluid clutch apparatus 10 to produce the active control force.

Figure 5:
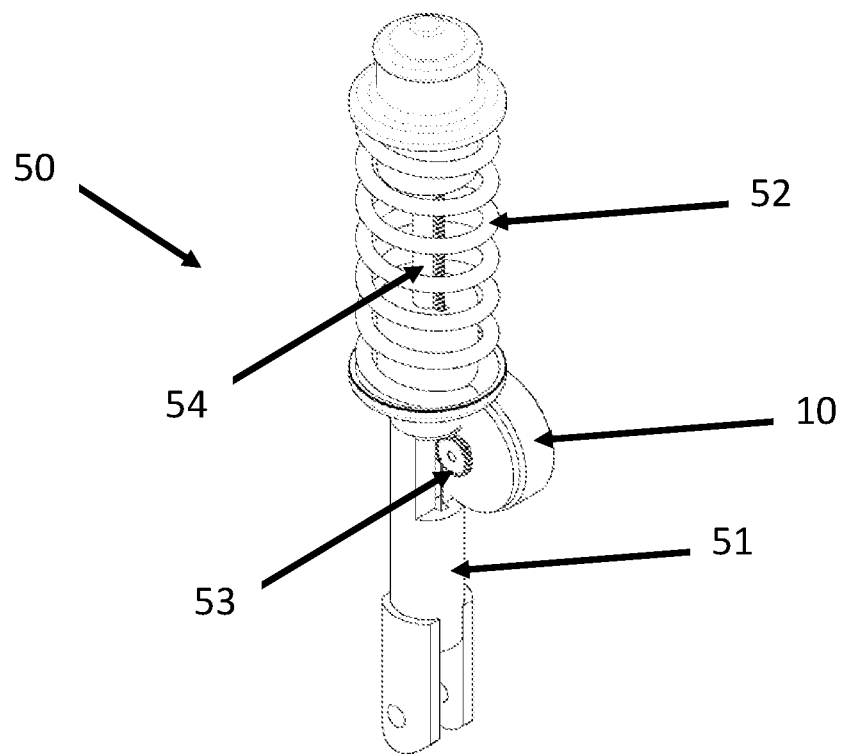
FIG. 5 is a perspective view of an active suspension system using MR fluid clutch apparatuses for a wheel assembly of a passenger vehicle.
Figure 6:
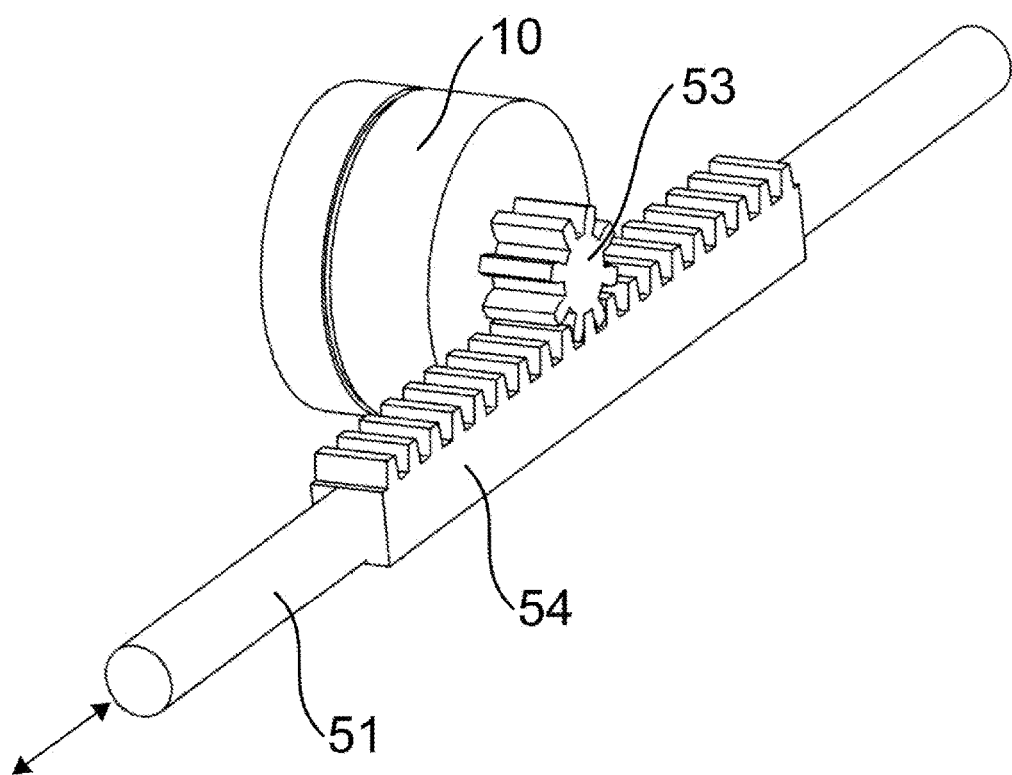
FIG. 6 is a perspective view of a single MR fluid clutch apparatus acting on a structural link of a body assembly.
Figure 7:
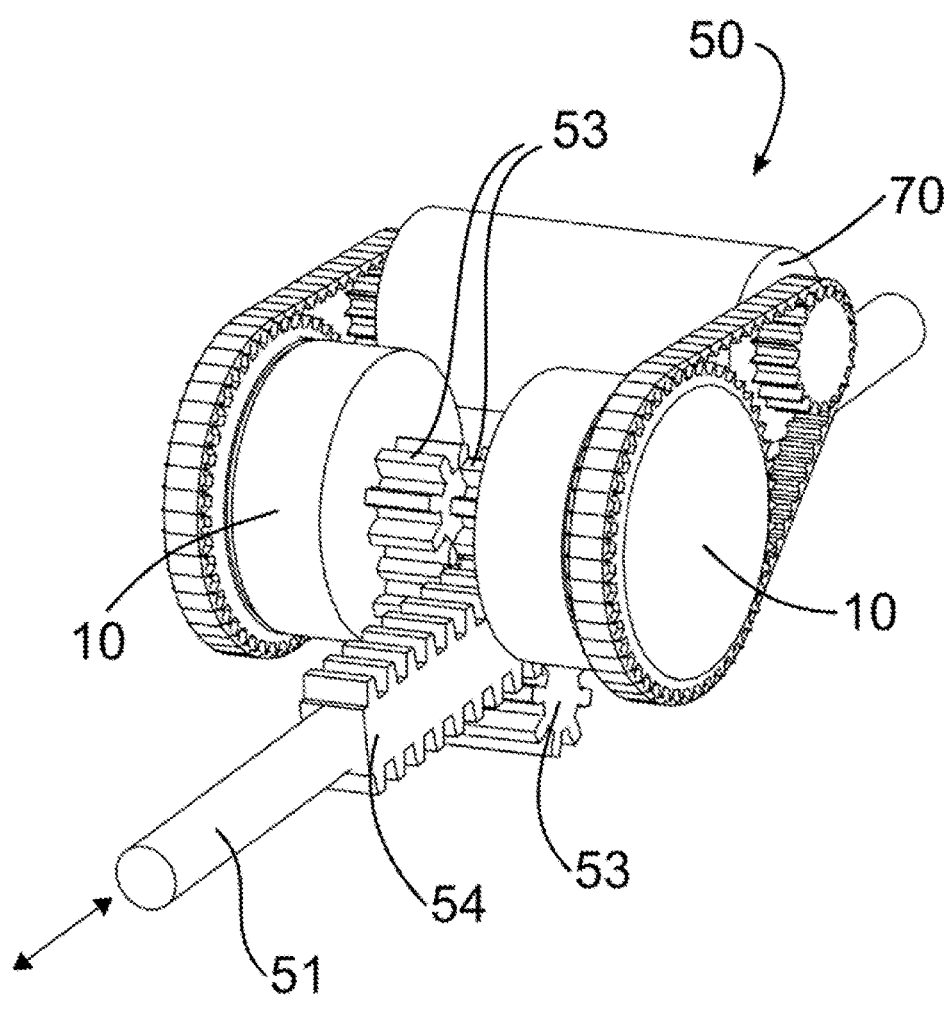
FIG. 7 is a perspective view of a pair of MR fluid clutch apparatuses acting on a structural link of a body assembly.

According to FIGS. 5, 6 and 7, the active suspension system may include subsystems 50 for each wheel assembly, in which movements of a structural link 51 coupled to the wheel assembly to define a relative rotation center and coupled to the sprung body, for instance by way of a pivot and accessories such as spring 52 and rack 54. In FIGS. 5 and 6, a single MR fluid clutch apparatus 10 is used, with a pinion 53 on the structural link 51, acting as an MR brake by providing braking of the movement of the structural link 51 in the unbiased direction by applying a force on rack portion 54. In FIG. 7, a pair of MR fluid clutch apparatuses 10 is used each with one of the pinions 53, on the structural link 51, defining the mechanism used to convert rotational outputs from motors 70 into back and forth translation of the rack portion 54 attached to the sprung body. The same arrangement can be used to convert back and forth translation movement of member 51 in relation to rack 54 into rotational movement of pinion 53 and use MR fluid clutch apparatuses to transmit rotational movement to motor 70, providing a way to recuperate the energy by doing regenerative braking with the motor 70.

In some configurations, a first structural link may be coupled to the wheel assembly to define a first relative rotation center, and may be rotationally coupled to the sprung body at a first pivot, with the suspension further including a second structural link coupled to the wheel assembly to define a second relative rotation center above the first relative rotation center, and rotationally coupled to the sprung body at a second pivot above the first pivot. The wheel suspension may define a geometry selected to minimize the horizontal kinetic displacement of the wheel assembly as the structural link 51 attached between any of the first or second structural and the sprung body moves through an active control range over its vertical travel.

Figure 8A:
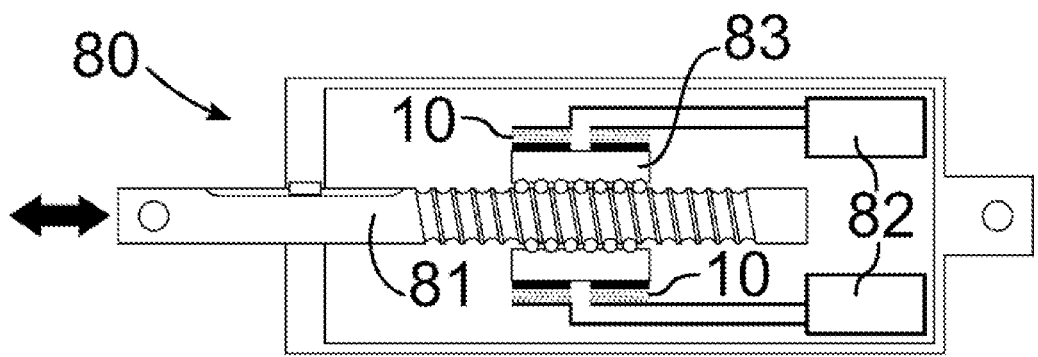
FIG. 8A is a schematic sectional view of a pair of MR fluid clutch apparatuses acting on nut of a ballscrew of a body assembly.

Referring to FIG. 8A, the subsystem 80 uses a pair of MR fluid clutch apparatuses 10 to control the rotation of a nut 83 of a ballscrew featuring a threaded rod 81, using the power provided by the motor 82 (although multiple motors could be used as well as exemplified previously). The rotational outputs from motors 82 are hence converted into back and forth translation of the threaded rod 81. The subsystem 80 may be placed in the middle of a coil spring (as in FIG. 5) or in parallel to a strut or spring/damper system.

Figure 8B:
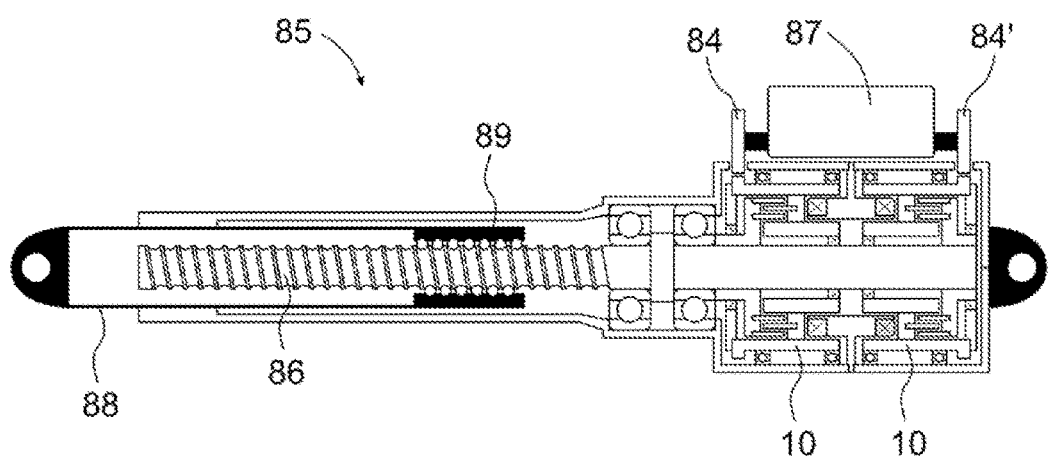
FIG. 8B is a schematic sectional view of a pair of MR fluid clutch apparatuses acting on a ballscrew of a body assembly.

Referring to FIG. 8B, subsystem 85 uses a pair of MR fluid clutch apparatuses 10 to control a rotation of a threaded rod 86, using the power provided by motor 87. The rotational output from the motor 87 is transmitted to the input of MR fluid clutch apparatuses 10 using mechanisms 84 and 84'. The input mechanism 84 may turn in the clockwise direction, while the input mechanism 84' may turn in the counter clockwise direction. Hence, the rotations caused by either one of the MR fluid clutch apparatuses 10 are converted by the ballscrew rod 86 into back and forth translations of the nut 89 connected to the sliding member 88. The subsystem 85 may be placed in the middle of the hollow central volume of a coil spring (as in FIG. 5) or in parallel to a strut or spring/damper system.

In the embodiments shown in FIGS. 5 to 8, the motor and MR fluid clutch apparatuses 10 may be located distally from the wheel assemblies, as shown in FIGS. 13 to 17, in which various configurations are shown to transmit motor actuation to wheel assemblies. FIGS. 5 to 8 show different mechanisms that are configured to receive force from the MR fluid clutch apparatuses 10, to actively control the wheel assemblies or other parts of a vehicle. Distal actuation may be transmitted using hydraulic tubes or cables, forming part of the mechanism.

Figure 9:
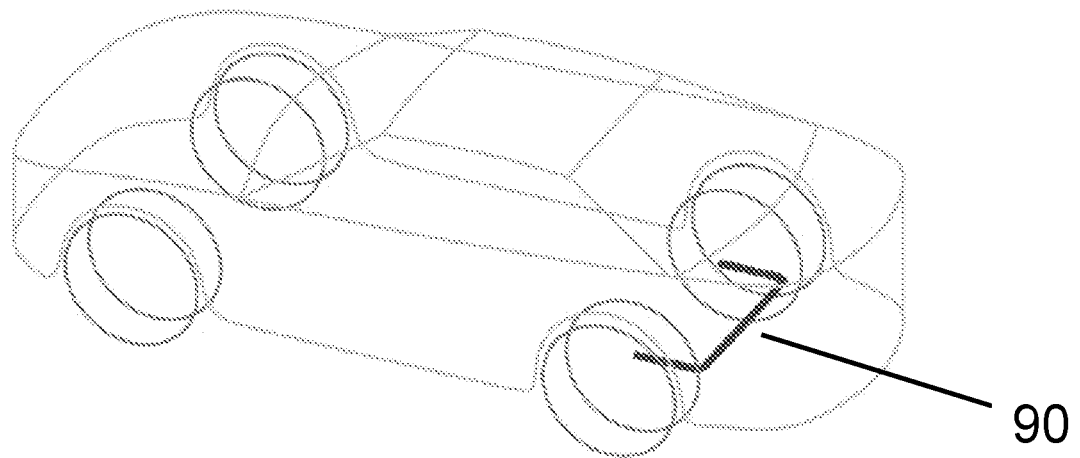
FIG. 9 is a schematic view of a passenger vehicle with roll bar.
Figure 10:
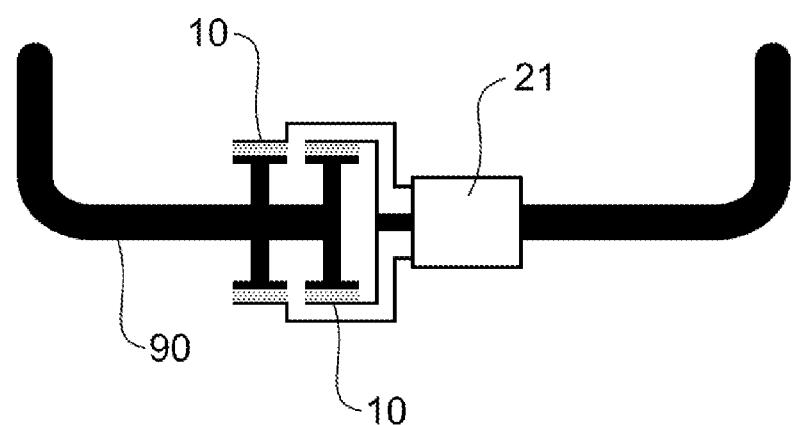
FIG. 10 is a schematic view of a roll bar with a pair of MR fluid clutch apparatuses in an active suspension system.

Referring to FIGS. 9 and 10, in accordance with another embodiment, the active suspension system may be applied to a roll bar 90 for a motor vehicle. For simplicity, the roll bar 90 is shown on the rear wheels of the vehicle, but another roll bar 90 could be used on the front wheels as well. Such an arrangement of front and rear roll bars 90 is well suited to level the vehicle in abrupt stops or accelerations. As shown in FIG. 10, the roll bar 90 is a split torsion bar, which is fastened rotatably to a vehicle chassis. The roll bar 90 features a pair of MR fluid clutch apparatuses 10 connected to two opposite wheel suspensions of the same axle of the vehicle, whereby opposite sides of the roll bar 90 are controlled concurrently by action of the MR fluid clutch apparatuses 10 and actuation from the motor 21. The roll bar 90 has an area for the MR fluid clutch apparatuses 10 to actively produce force between the action movements of the opposite wheel suspensions.

Figure 11:
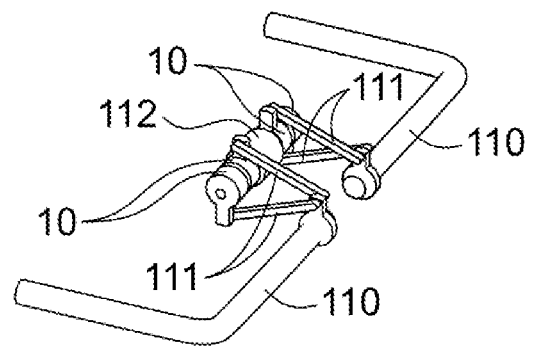
FIG. 11 is a perspective view of separated roll bar portions each operated by a pair of MR fluid clutch apparatuses and linkages in an active suspension system.

Referring to FIG. 11, two roll bar portions 110 are the mechanisms connected to the chassis (or body) using an active suspension system featuring two pairs of MR fluid clutch apparatuses 10 and linkages 111 (i.e., transmission), whereby the action movements of the opposite wheel suspensions (i.e., at ends of the roll bar portions 110) may be fully uncoupled in off state, so as to have negligible effect on the behavior of the wheels. In the on state, a minimum of elastic coupling of the spring action movements of the opposite wheel suspensions must be provided by the roll bar portions 110.

The split roll bar of FIG. 11 therefore may features a power source (i.e: an electromagnetic or hydraulic motor) 112 connected to MR fluid clutch apparatuses 10 composing the MR fluid actuator unit. The MR fluid actuator unit is mounted to each of the two ends of the roll bar portions 110 forming the split hub, each controlling one wheel of the axle. Each axle is then controlled independently, with the pair of MR fluid clutch apparatuses 10 arranged in the right axle and another pair of the MR fluid clutch apparatus 10 arranged on the left axle. The result is an active suspension as controlled forces are introduced to the wheel assemblies via the roll bar portions 110, between the sprung mass of the vehicle body and its occupants, and the unsprung mass of the wheel assemblies, independently from relative position or velocity.

Figure 12:
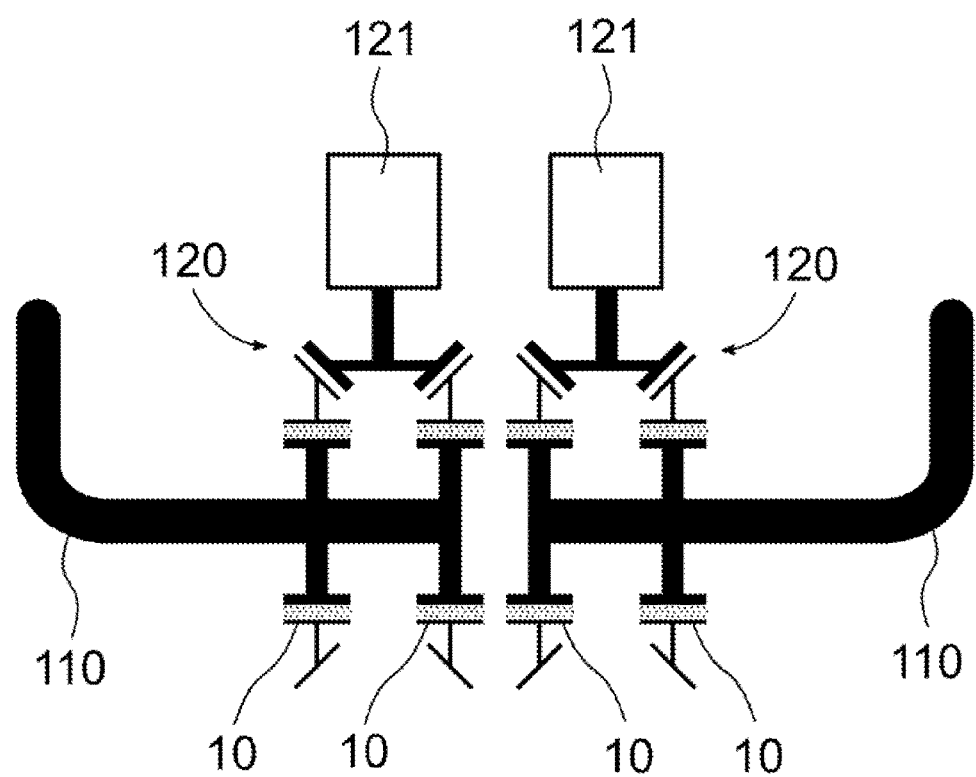
FIG. 12 is a perspective view of separated roll bar portions each operated by a pair of MR fluid clutch apparatuses and gears in an active suspension system.

Referring to FIG. 12, a similar configuration to that of FIG. 11 is illustrated, but using a gear transmission 120 (e.g., bevel gears) instead of linkages 111. The roll bar portions 110 are therefore controlled independently from one another, as the active suspension system features an individual motor 121 and two MR fluid clutch apparatuses 10 for each roll bar portion 110. FIG. 12 is shown with two motors 121 but only one motor with distributed force could be used.

In the above-described arrangements, to enhance the reliability of the roll bar, the arrangement of MR fluid clutch apparatuses 10 is used to connect the roll bar portions to one another. It is thus possible to automatically uncouple the roll bar portions from one another during the straight-line travel of the vehicle and to automatically couple them again during travel in a curve. This is done by the sensors 24 gathering the state of the vehicle, and the controller 25 appropriately controlling the MR fluid clutch apparatuses 10.

It is also considered for the clutch arrangement to connect the first roll bar portion to the second roll bar portion in such a way that they rotate in unison as a function of the actual and/or expectable lateral acceleration of the vehicle. It is thus possible to automatically uncouple the roll bar during the straight-line travel of the vehicle and to automatically couple it again during travel in a curve.

A clutch arrangement of a roll bar can be embodied according to an alternative embodiment if the first roll bar portion and the second roll bar portion are connectable to one another, to rotate in unison, such that it is axially displaceable as a whole by the clutch arrangement. The clutch arrangement can be preferably controlled as a function of the velocity of the vehicle and the steering angle and/or the angular velocity of the steering wheel and/or the lateral acceleration of the vehicle, all of which may be part of the state of the vehicle obtained by the sensors 24. To rule out a safety hazard during a possible malfunction, the clutch arrangement may have redundancy such that remains at least partially functional in case of a defect. In another embodiment, the active suspension system with the MR fluid clutch apparatuses 10 can be installed in parallel or concentrically to a soft torsion bar and only used as a stiffness increaser. Accordingly, the active suspension system as described above is a relative cost-effective semi-active or fully active roll bar which is always sufficiently effective during travel in a curve as well as in evading maneuvers and also affects the spring action characteristics of the vehicle in order to enhance driving smoothness.

Figure 13:
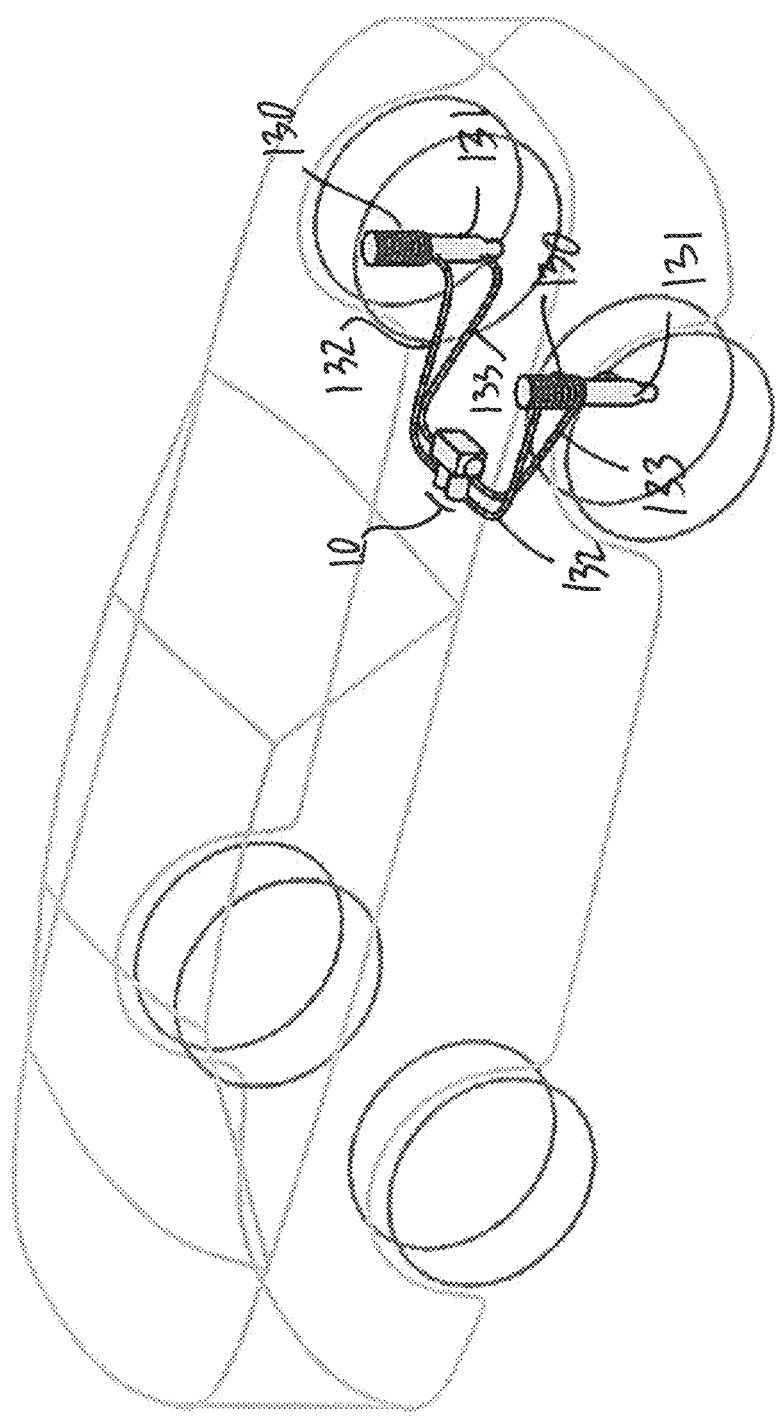
FIGS. 13-17 are schematic views of active suspension systems for passenger vehicles using MR fluid clutch apparatuses.

In FIG. 13, the MR fluid clutch apparatuses 10 are located distally while a spring 130 and a hydraulic actuator or piston 131 are located at each wheel. The MR fluid clutch apparatuses 10 provide active motion control to each wheel in two directions using two distinct hydraulic conduits 132 and 133. One of the hydraulic conduits may be used to transmit the required active motion control forces to hydraulic actuator or piston 131 at the wheel in one direction while the other conduit may be used to transmit the force in the other direction. The biasing member or spring 130 may be used to support the sprung weight and transmit part of the load to the unsprung weight.

Figure 14:
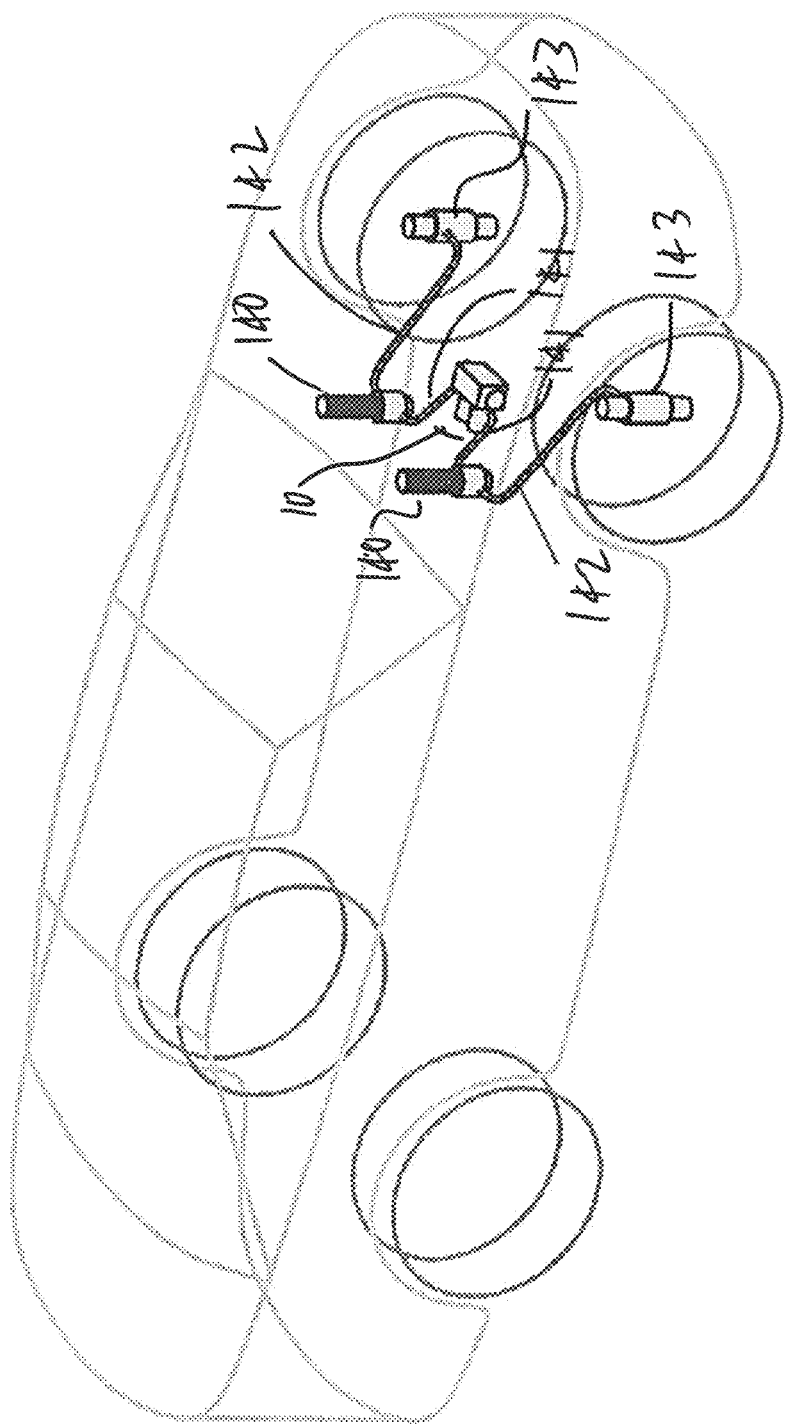

In FIG. 14, the MR fluid clutch apparatuses 10 and the combined spring and actuator or piston systems 140 (a.k.a., biased piston system in which a piston is biased to pressure oil) are located distally. The MR fluid clutch apparatuses 10 provide active motion control force to each spring and actuator or piston system 140 in one direction using a single hydraulic conduit per wheel. The spring in the system 140 provides a biasing force to maintain a given pressure in the conduit 140, whereas the MR fluid clutch apparatuses 10 provides additional force to actively control the output force. The hydraulic conduits 141 may be used to transmit the required active motion control forces to the spring system in one direction. The force between the spring actuator or piston system 140 and wheel actuator or piston 143 is transmitted by the hydraulic conduit 142. Only one hydraulic actuator or piston 143 is installed at the wheel in order to provide force to the wheel. The biasing member or spring 140 may be used to support the sprung weight and transmits the load to the unsprung weight using the conduit 142. The conduit 142 is then used to support both the sprung weight and to provide the force for the active suspension system. The system illustrated can only provide force in one direction. In some application, only providing active suspension in one direction may provide acceptable improvement over a passive suspension system.

Figure 15:
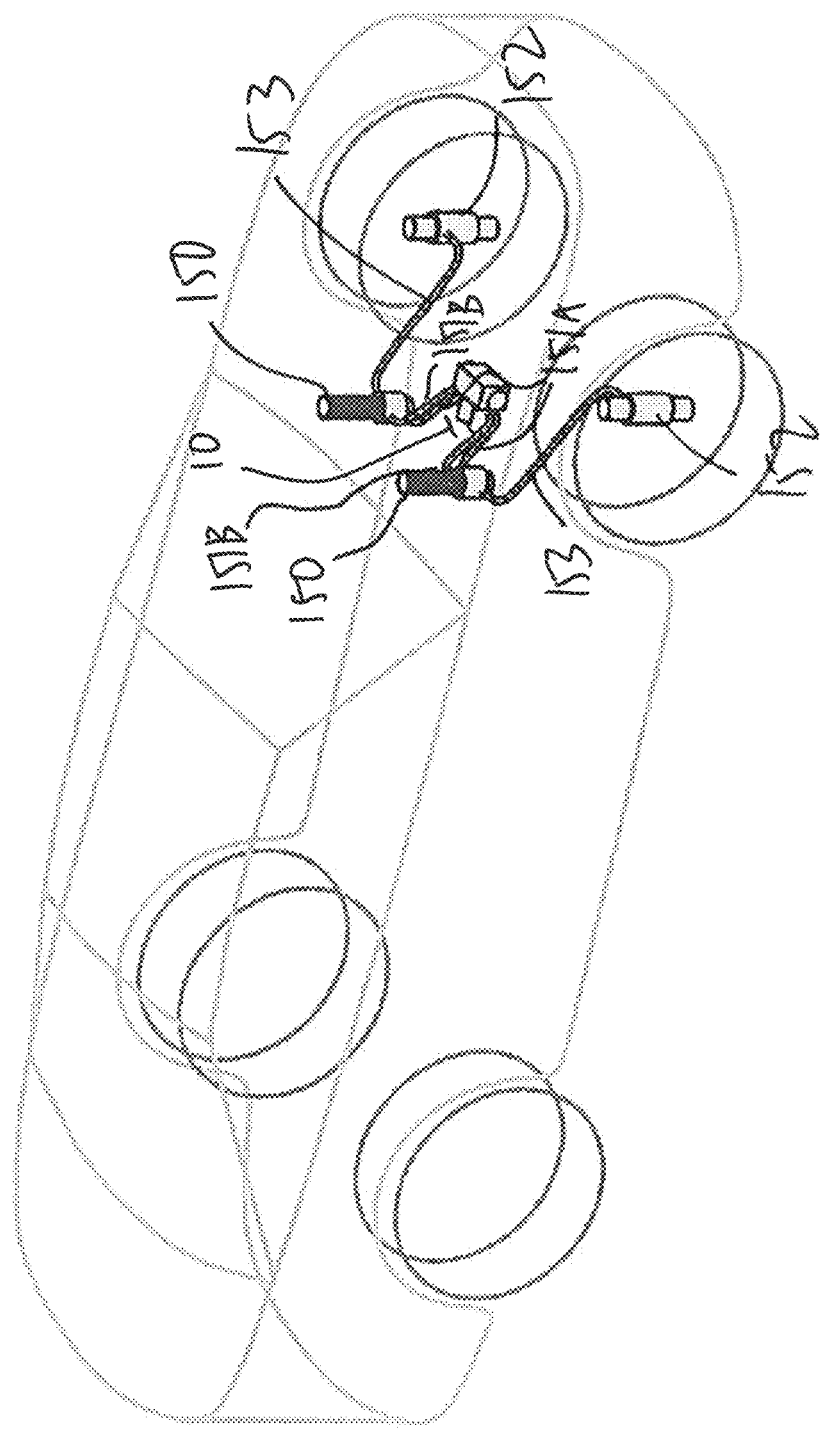

In FIG. 15, the MR fluid clutch or clutches 10 and the combined spring and actuator or piston systems 150 are located distally. The MR fluid clutch apparatuses 10 provide active motion control force to each spring and actuator or piston system 150 in two directions using two hydraulic conduit per wheel. The hydraulic conduits 151A may be used to transmit the required active motion control forces to the spring system in one direction while the hydraulic conduits 151B are used to transmit the force in the other direction. The force between the spring actuator or piston system 150 and the wheel actuator or piston 152 is transmitted by the hydraulic conduit 153. The actuator or piston 152 is installed at the wheel in order to provide force to the wheel. The biasing member or spring 150 may be used to support the sprung weight and transmits the load to the unsprung weight using the conduit 153. The conduit 153 is then used to support the sprung weight and to provide the force for the active suspension system. Again, the spring in the system 150 provides a biasing force to maintain a given pressure in the conduit 153, whereas the MR fluid clutch apparatuses 10 provides additional force to actively control the output force.

Figure 16:
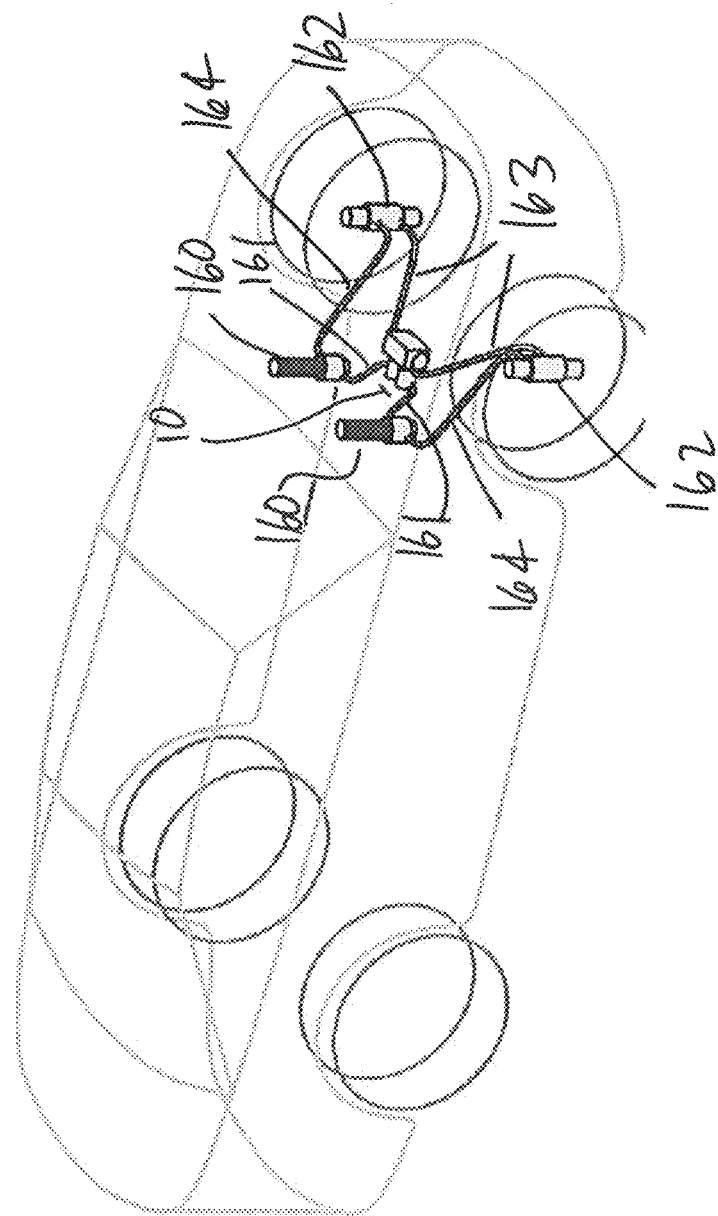

In the FIG. 16, the MR fluid clutch apparatuses 10 and the spring actuator or piston system 160 are located distally. Only one hydraulic actuator or piston is installed at the wheel in order to provide force to the wheel, in two directions, using 2 distinct hydraulic conduits. The MR fluid clutch apparatus 10 provide active motion control force to each spring and actuator or piston system in one direction using one hydraulic conduit 161 per wheel while the active motion control force for the other direction is applied at the wheel actuator or piston 162 using the hydraulic conduit 163. The force between the spring actuator or piston system 160 and the wheel actuator or piston 162 is transmitted by the hydraulic conduit 164. The actuator or piston 162 is installed at the wheel in order to provide force to the wheel. The biasing member or spring 160 may be used to support the sprung weight and transmits the load to the unsprung weight using the conduit 164. The conduit 164 is then used to support both the sprung weight and to provide the force for the active suspension system. The spring in the system 160 provides a biasing force to maintain a given pressure in the conduit 164, whereas the MR fluid clutch apparatuses 10 provides additional force to actively control the output force.

Figure 17:
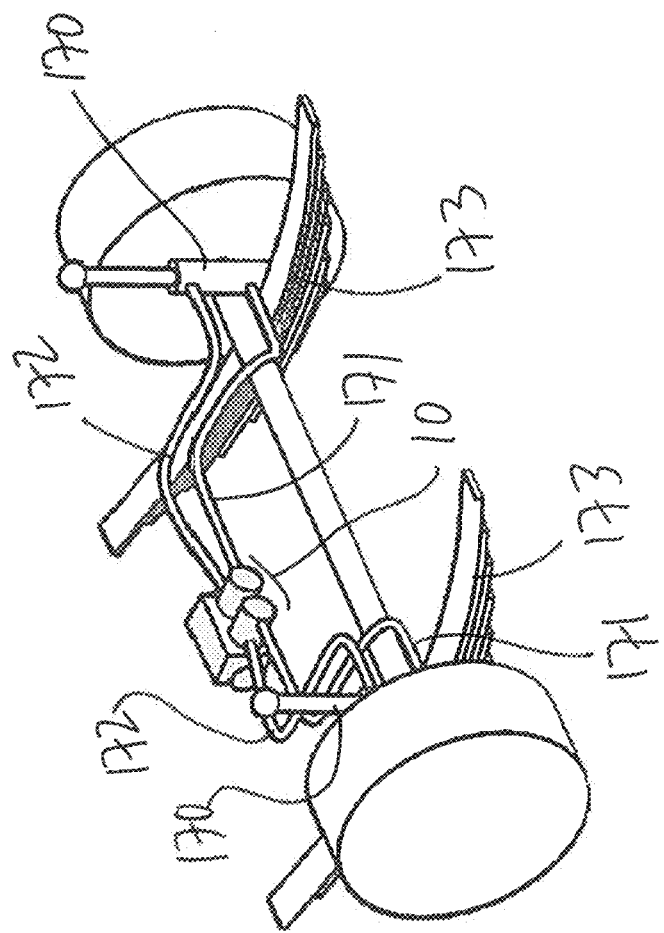

In FIG. 17, the MR fluid clutch apparatuses 10 are located distally. The system illustrated can provide force in two directions. An hydraulic actuator or piston is installed at the wheel in order to provide force to the wheel, in two directions, using two distinct hydraulic conduits. The MR clutch fluid clutch apparatuses 10 provide active motion control force to actuator or piston system 170 in two directions using respectively hydraulic conduit 171 and 172, for each wheel. The actuator or piston 170 is installed at the wheel in order to provide force to the wheel, in parallel to the action of spring 173. The biasing member or spring 173 may be used to support the sprung weight and transmits the load to the unsprung weight without using any hydraulic conduit.

In some implementations, the active suspension system defines a geometry selected to produce a minimal wheel toe change through its vertical travel. The active suspension system may be constructed and arranged to provide a maximum product of lateral tire stiffness and lateral displacement of a tire patch defined between wheel assembly and a support surface, and may be constructed and arranged to provide a maximum product of angulation of a wheel rim of the wheel assembly about a vertical axis through the vertical travel and a cornering stiffness of a tire of the wheel assembly. The suspension may also define a geometry selected to produce a minimal tread width change through its vertical travel. According to another embodiment, the active suspension system includes an actuated member connected to both the wheel assembly and the sprung body and adapted to apply an active control force between the body and wheel assembly to move the wheel assembly vertically over a total active control range of vertical wheel displacement. The suspension forms a geometry selected to produce a minimum horizontal kinetic displacement of the wheel assembly as the wheel assembly is moved through the total active control range of vertical wheel displacement.

According to yet another embodiment, the active suspension system may include upper and lower structural members and is adapted to permit the rear wheel assembly to move relative to the sprung body through a jounce and rebound vertical travel limited by mechanical stops. The upper structural member is coupled to the wheel assembly to define an upper relative rotation center, and rotationally coupled to the sprung body at an upper pivot. The lower structural member is coupled to the wheel assembly to define a lower relative rotation center disposed on a side of a gravitational center of the wheel assembly opposite the upper relative rotation center, and rotationally coupled to the sprung body at a lower pivot. The active suspension system may define a geometry selected to produce a minimum lateral displacement of the gravitational center of the wheel assembly through its vertical travel, and a minimum wheel camber change through its vertical travel.

In some embodiments, the active suspension system also includes an actuator connected to both the wheel assembly and the sprung body and adapted to apply an active control force between the body and wheel assembly to move the wheel assembly along its vertical travel. In some cases, the upper relative rotation center and upper pivot are disposed along a first generally horizontal line, and the lower relative rotation center and lower pivot are disposed along a second generally horizontal line, with the automobile at rest and loaded to its design weight. The lateral displacement of the gravitational center of the wheel assembly is minimized and the wheel camber change is also minimized through its vertical travel.

According to another aspect of the invention, the active suspension system includes a lower structural member coupled to the wheel assembly to define a lower relative rotation center disposed on a side of a gravitational center of the wheel assembly opposite the upper relative rotation center, and rotationally coupled to the sprung body at a lower pivot, and an actuator connected to both the wheel assembly and the sprung body to define an upper relative rotation center, and rotationally coupled to the sprung body at an upper pivot. The actuator is adapted to apply an active control force between the body and wheel assembly to move the wheel assembly over an active control range. In some cases, the wheel assembly is a front wheel assembly of an automobile, and the horizontal kinetic displacement as measured along an axis extending perpendicular to a direction of travel of the vehicle is controlled. The active suspension system may define a geometry selected to produce a minimized tread width change through its vertical travel.

According to another aspect of the invention, the active suspension system may include upper and lower structural members and an actuator. The upper structural member is coupled to the wheel assembly to define an upper relative rotation center, and rotationally coupled to the sprung body at an upper pivot. The lower structural member is coupled to the wheel assembly to define a lower relative rotation center disposed on a side of a gravitational center of the wheel assembly opposite the upper relative rotation center, and rotationally coupled to the sprung body at a lower pivot. The actuator is connected to both the wheel assembly and the sprung body and adapted to apply an active control force between the body and wheel assembly to move the wheel assembly over an active control range. The suspension defines a geometry selected to produce a controlled tread width change through its vertical travel.

Figure 18:
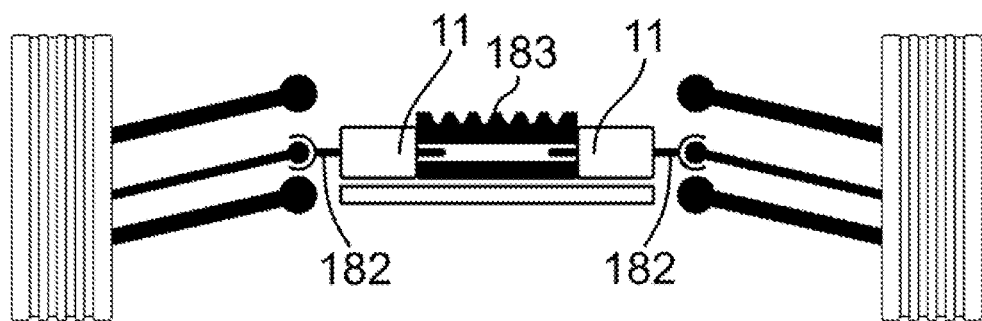
FIGS. 18 and 19 are schematics views of an active steering system for a passenger vehicle using MR fluid clutch apparatuses.
Figure 19:
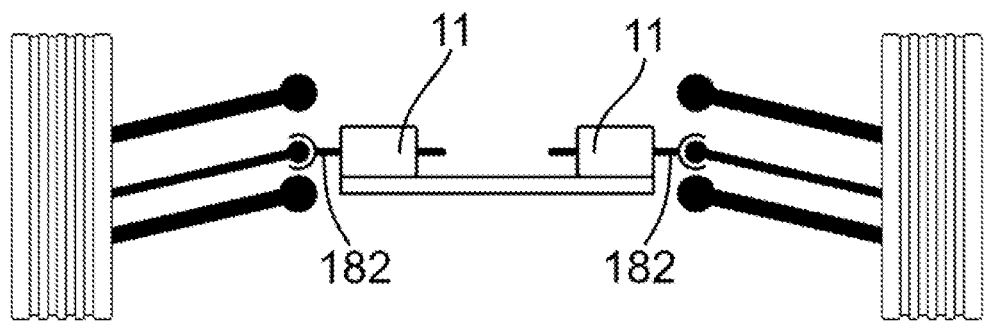

Referring to FIGS. 18 and 19, in accordance with yet another embodiment of the present disclosure, the active MR fluid actuator units 11 (as in FIG. 21) are installed in series with a steering member 182 in order to adjust the steering angle in function of the wheel position or another input. The active steering system may therefore control two sides independently, hence contributing to eliminate the toe-in toe-out movement when the suspension is moving. The arrangement of FIG. 18 is done with the outputs of the MR fluid actuator units 11 fixed to the rack 183 of the steering system, allowing the two sides to move together in a standard matter, the MR fluid actuator units 11 being used to fine tune the steering angle of both wheels in order to achieve the desired dynamics. The arrangement of FIG. 19 is done with the MR fluid actuator units 11 working independently and fixed to the chassis of the vehicle. This configuration allows each wheel to be controlled independently, allowing desired adjustment of each wheel angle in order to achieve the specified dynamics. It is to be noted that both MR fluid actuator unit 11 can share a same power input or used different power input. It is to be noted that the configuration of FIG. 19 results in a drive by wire vehicle. In such a case, the active system is an active control system.

Figure 20:
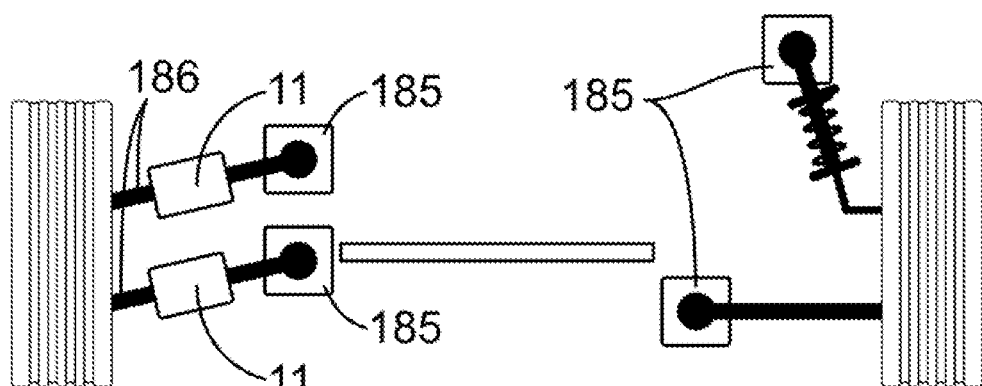
FIG. 20 is a schematic view of an active pivot point and of a suspension linkage being expandable, for a passenger vehicle, using MR fluid clutch apparatuses.

As seen in FIG. 20, according to yet another embodiment, the active suspension system may include MR fluid actuator units at the pivot points 185 in order to change the relative position of one in relation to the other. The relative position adjustment allows the adjustment of the suspension geometry to specific conditions. It can be used for example to neutralise the camber change during the travel of the wheel, hence improving the behaviour of the active suspension. Different adjustments can also be done by changing the length of the suspension link 186 using other MR fluid actuator units 11.

Figure 22:
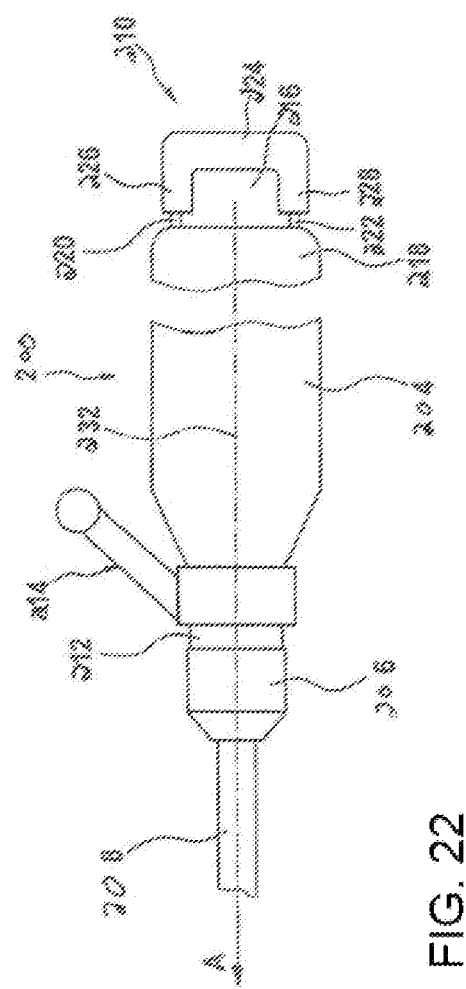
FIG. 22 is a schematic view of a power tool with a handle using an active suspension with MR fluid actuator unit in accordance with the present disclosure.
Figure 24:
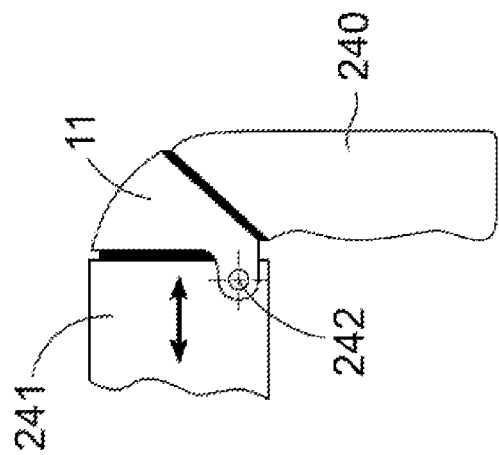
FIG. 24 is a schematic view of a handle with active suspension system with MR fluid actuator unit at a pivot point between handle and tool.

As seen in FIG. 22, according to yet another embodiment, an active motion control system may be installed between a tool and a decoupled portion of the tool, usually the handle, in order to reduce the effect of the relative force or acceleration of one in relation to the other. The force adjustment allows for force variation or acceleration at the handle to be controlled in relation to specific conditions. It can be used for example to neutralise the force variation or acceleration perceived at the handle while the tool is still generating high force variation on the body of the tool, hence improving the comfort to the tool.

The description will be done for a hand-held power tool 200, which is depicted schematically in FIG. 22 and is designed as a rotary hammer or a percussion hammer. The hand-held power tool 200 is essentially composed of a housing 204, a tool holder 206 for accommodating a tool 208, and a drive device (not shown) enclosed by housing 204 that drives tool 208 installed in tool holder 206. However, the dynamic motion control described herein could be installed on other types of tools or equipment as well, the hand-held power tool 200 merely being provided as an example. It could also be installed to tools or equipment that are not manipulated by hand but where force variations or acceleration reduction is targeted. It is also to be noted that for simplicity, a single degree of freedom will be described, namely the reciprocating motion of the tool 208 relative to the housing 204, but that multiple degree of freedom handle or fixtures could be controlled with multiple MR fluid actuator units, for instance with multiple MR fluid actuator units sharing the same power source, or each having an own power source.

The drive device is typically composed of an electric or pneumatic drive motor that drives tool holder 206 via reduction gears and/or a transmission in a rotating manner, and an impact mechanism that is also driven by the drive motor, and with which tool 208 in tool holder 206 may be acted upon with an impact force that acts in a working direction A of machine tool 200.

Housing 204 is provided with a handle 210 on its end face that faces away from tool holder 206. The handle 210 is used, for instance with or without an additional handle 214 that is detachably attached to housing 204 near tool holder 206 at 212, to grip and hold machine tool 200. Together with housing 204, rounded handle 210, which extends beyond housing 204, encloses a grip opening 216 for a hand of an operator and makes it easier for him/her to hold and guide the machine tool 202, particularly during vertical operation, i.e., in vertical working direction A and with tool 208 oriented downward, while additional handle 214 is used preferably when working direction A is oriented horizontally.

The handle 210 is essentially composed of a hollow yoke 224 that extends perpendicularly to working direction A of the hand-held power tool 200 and that is gripped with one or both hands by the operator in order to use the hand-held power tool 200. The handle 210 may also be composed of two hollow legs 226, 228 that extend parallel to working direction A and are open at their end faces adjacent to housing 204, thereby enabling projections 220, 222 of housing 204 to enter legs 226, 228.

To reduce the vibrations of housing 204 caused, for example by the impact mechanism of machine tool 200, from being transferred to the handle 210—the vibrations not only being perceived as uncomfortable by the operator but also possibly resulting in injury after long-term exposure— the two legs 220, 222 of housing 204 extend into the hollow legs 226, 228 of the handle 210 with lateral play. In addition, the handle 210 does not bear directly against projections 220, 222 or housing 204, but rather via a helical compression spring (not shown), which serves to decouple vibrations between the handle 210 and the housing 204. To prevent the handle 210, which has been decoupled from housing 204 as described above, from tilting when the hand-held power tool 200 is used and a compressive force is applied to the handle 210, and this compressive force is introduced such that it is not parallel to working direction A or it is directed toward one side of a longitudinal central plane 232 (FIG. 22) of hand-held power tool 202, the motions of the two hollow legs 226, 228 along projections 220, 222 are synchronized with the aid of a coupling mechanism (not illustrated).

Figure 23:
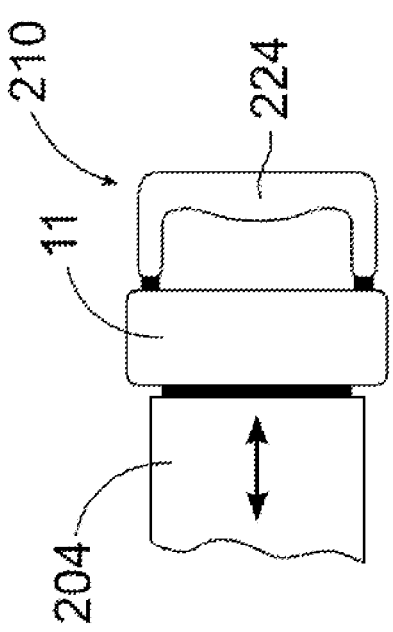
FIG. 23 is a schematic view of the handle having translation movement of a tool of FIG. 22, showing the MR fluid actuator unit.

In FIG. 23, in order to decrease the vibration level in handle 210, one end of a MR fluid actuator unit 11 is attached to one of the handle 210 or the body 204 and the other end is attached to the other component. The MR fluid actuator unit 11 is then used to apply a counter-force between the components and then decrease the force variation or acceleration on the handle 204 achieving a further decoupling of the handle 210 from the movement of the body 204. This is particularly useful when the suppression of force variation or acceleration is desired on the handle 210. Additional components may be provided, such as a spring or a damper (not illustrated) in between the handle 210 and the body 204 or any other part there between. Linkage (not illustrated) may also be provided between handle 210 and body 210 to guide the movement of one part in relation to the other. The MR fluid actuator unit can be installed either in series or in parallel with the other components.

In another embodiment, instead of translating, the handle 240 may pivot around a joint 242 and a MR fluid actuator unit 11 may be installed to control the pivoting of handle 240 part in relation to the body 241. This arrangement can be particularly useful in handheld power tools. It is to be noted that other handle configurations combining rotating and translating movement can be controlled with MR fluid actuator unit(s) 11 but are not illustrated here.

Figure 25A:
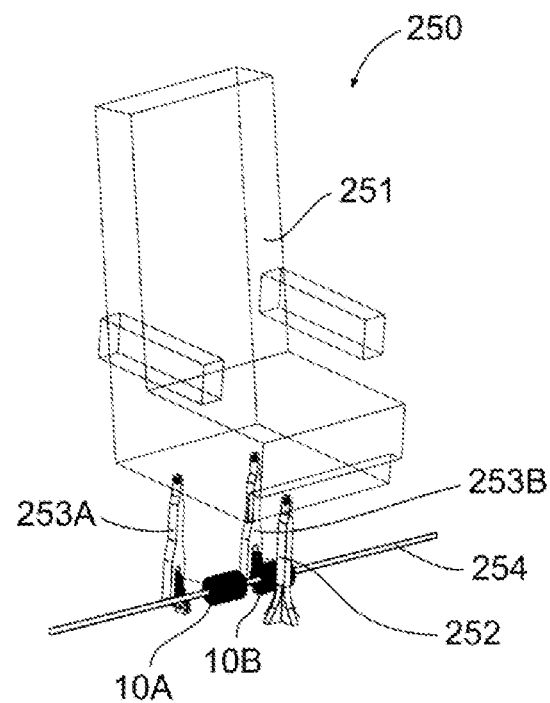
FIG. 25A is a schematic view of a dynamic motion control system using a MR fluid actuator unit fitted to a seat with 2 Degrees Of Freedom (DOF)

As seen in FIG. 25A, a schematic view of a control system for an active platform 250 using MR fluid clutch apparatuses 10 is provided. In the active platform 250, a seat 251 is illustrated and is supported at 3 points but more or fewer points may be used. Front point may be mounted on an unactuated pivot mount 252 and on two moveable mounts 253A and 253B. Rear mounts 253A and 253B may be mounted on joints that allow movement of mounts 253A and 253B independently one from the other. The mounts 253A and 253B are actuated by MR fluid clutch apparatuses 10A and 10B, respectively. In FIG. 25A, MR fluid clutches apparatuses 10A and 10B get rotational power from a shaft 254 that is powered by a single power source (not illustrated).

Figure 25B:
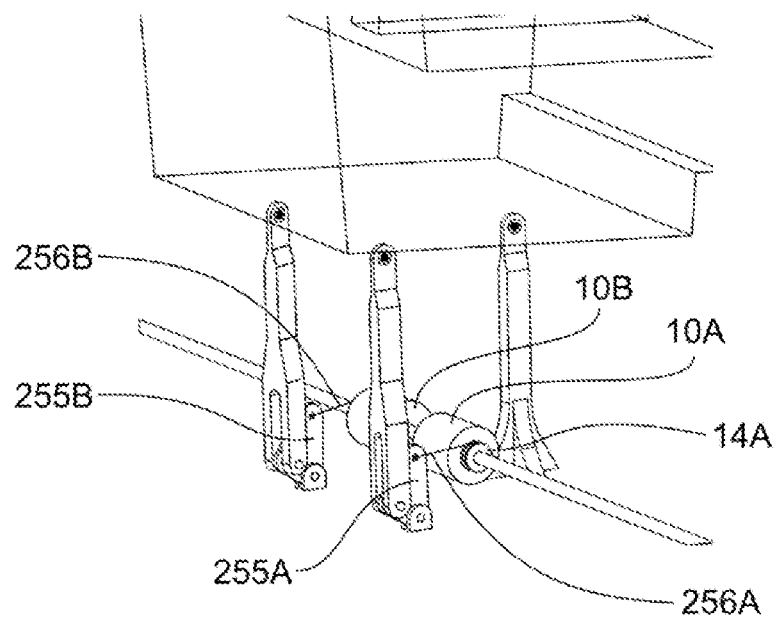
FIG. 25B is a schematic view of the 2DOF mechanism of the MR fluid actuator unit of FIG. 25A.

FIG. 25B is a close-up schematic view of FIG. 25A. In the illustrated embodiment, only one MR fluid clutch apparatus 10 is used for each moveable support 253A and 253B in order to provide upward movement. Downward movement is achieved using gravity as a biasing force. This limits the downward acceleration to 1 g. If faster downward movement is required, additional biasing member like a spring or additional MR fluid clutches may be used. In the illustrated embodiment, upward movement of movable mounts 253A and 253B is done by linking the MR fluid clutch apparatuses 10 to pivot members 255A and 255B, respectively, using the output members 14A and 14B (hidden) of the MR fluid clutch apparatuses 10A and 10B. In the illustrated embodiment, link between output member 14A and pivot 255A is achieved using a cable 256A and link between output member 14B and pivot 255B is achieved using a cable 256B. Other type of links may be used, including gears, pinions and chains, direct linkage connection, etc. Since the moveable mounts 253A and 253B may move independently, the result movement of the seat 251 may be a combination of translation and rotation (two degrees of freedom of movement to the seat 251, namely up/down and roll. In order to ensure free movement of the links and the seat, universal joints may be fitted at the end of the moveable mounts 253A and 253B. Other types of compliant connections may be used (i.e flexible mount or gimbals only to name a few). In order to support the seat 251 when no movement is required, MR fluid clutch apparatus 10 may be added for each degree of actuation in order to brake the movement in relation to the chassis of the seat (not illustrated).

Figure 26:
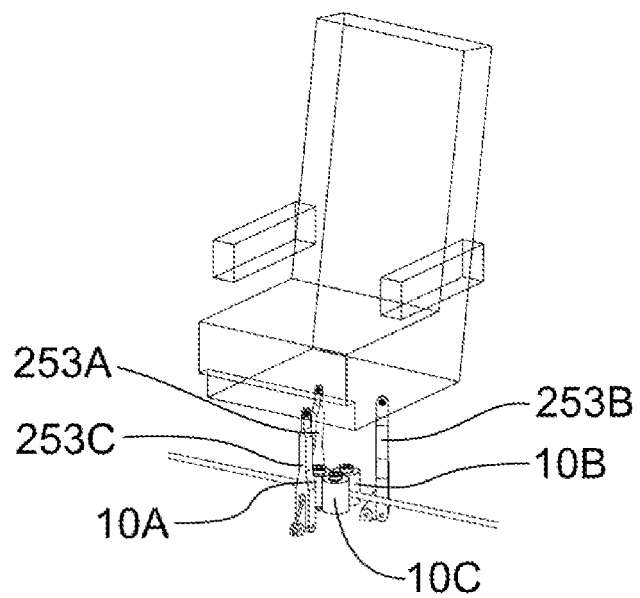
FIG. 26 is a schematic view of a dynamic motion control system using MR fluid actuators fitted to a seat with 3DOF.

FIG. 26 is a schematic view of an active platform 250 similar to the one of FIGS. 25A and 25B but with three MR fluid clutches apparatuses 10 acting on three moveable mounts 253 instead of two, to enable pitch, roll and up/down movements of the seat 251. Additional moveable mounts may also be used. On FIG. 26, moveable mount 253C may be actuated by MR fluid clutch apparatus 10C.

Figure 27:
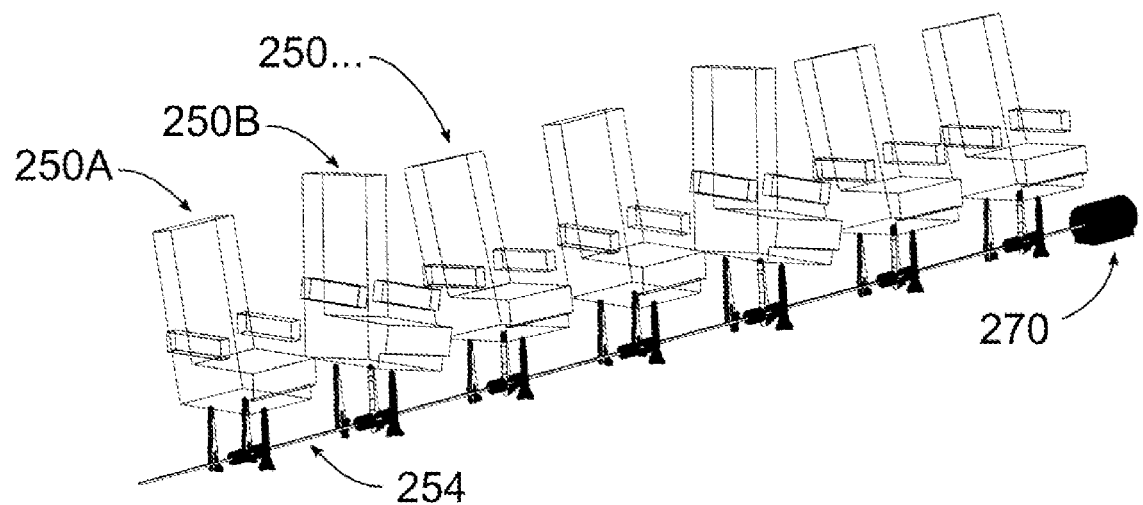
FIG. 27 is a schematic view of a dynamic motion control system using MR fluid actuator units fitted to a row of seats sharing a single power source.

FIG. 27 is a schematic view of multiple active platforms 250 sharing a common power source 270. Power source 270 powers shaft 254 that is common to multiple active platforms 250. For simplicity reasons, there is illustrated a single shaft 254 for all active platform 250 but the shaft 254 may be built in multiple sections. Multiple sections of shaft 254 may be linked with coupling to allow function of the shaft in various orientations. Multiple shafts 254 may be installed angled one relative to another using universal joints or other type of compliant joints. This system with one power source 270 for multiple active platforms 250 is a way to have multiple active platforms 250 moving independently one from another.

The active platform of FIGS. 25A to 27 may be fitted with seat 251 and may become part of an augmented reality device where movement of the seat 251 is imposed. Those platforms equipped with seats may be used in entertainment or simulation environments. More complex platform may also be developed. In example, a Stewart platform may be used instead of the proposed embodiment in order to provide more degrees of freedom. Each link of the Stewart platform may be driven by one MR fluid actuator 11 composed of one or multiple MR fluid clutch apparatuses 10.

Figure 28:
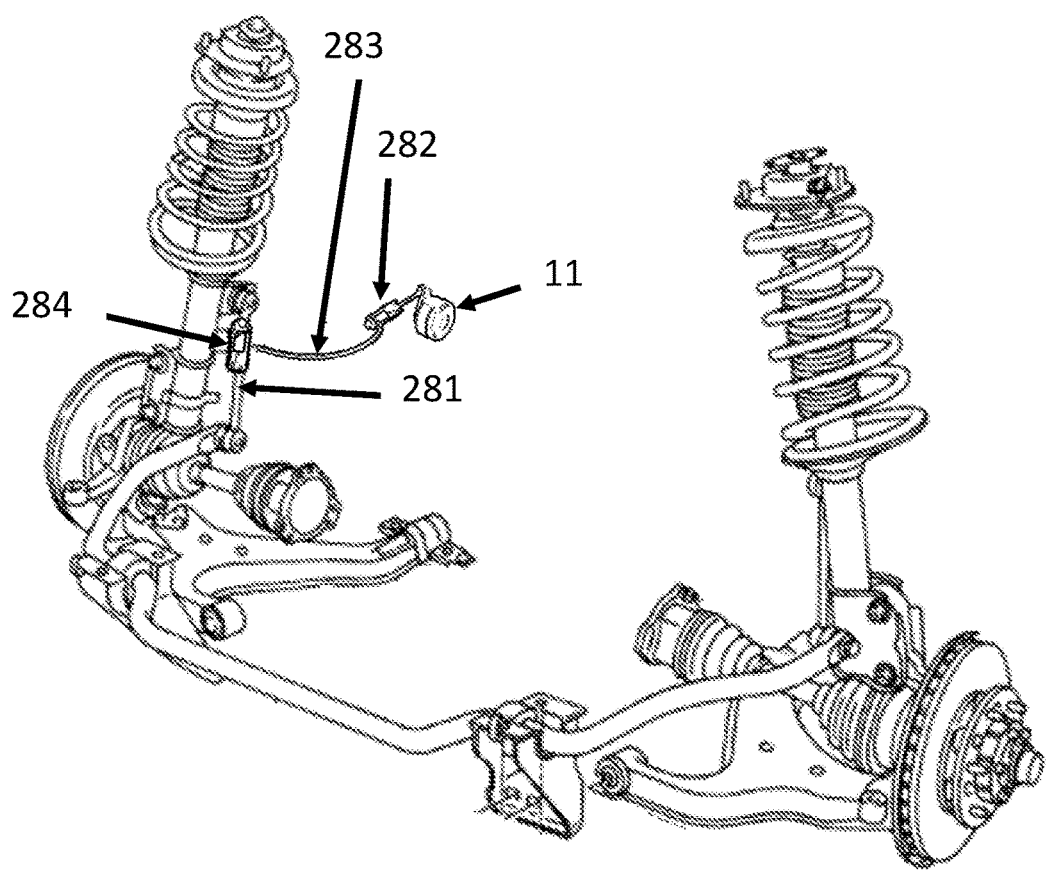
FIG. 28 is a schematic view of an active suspension link.
Figure 29:
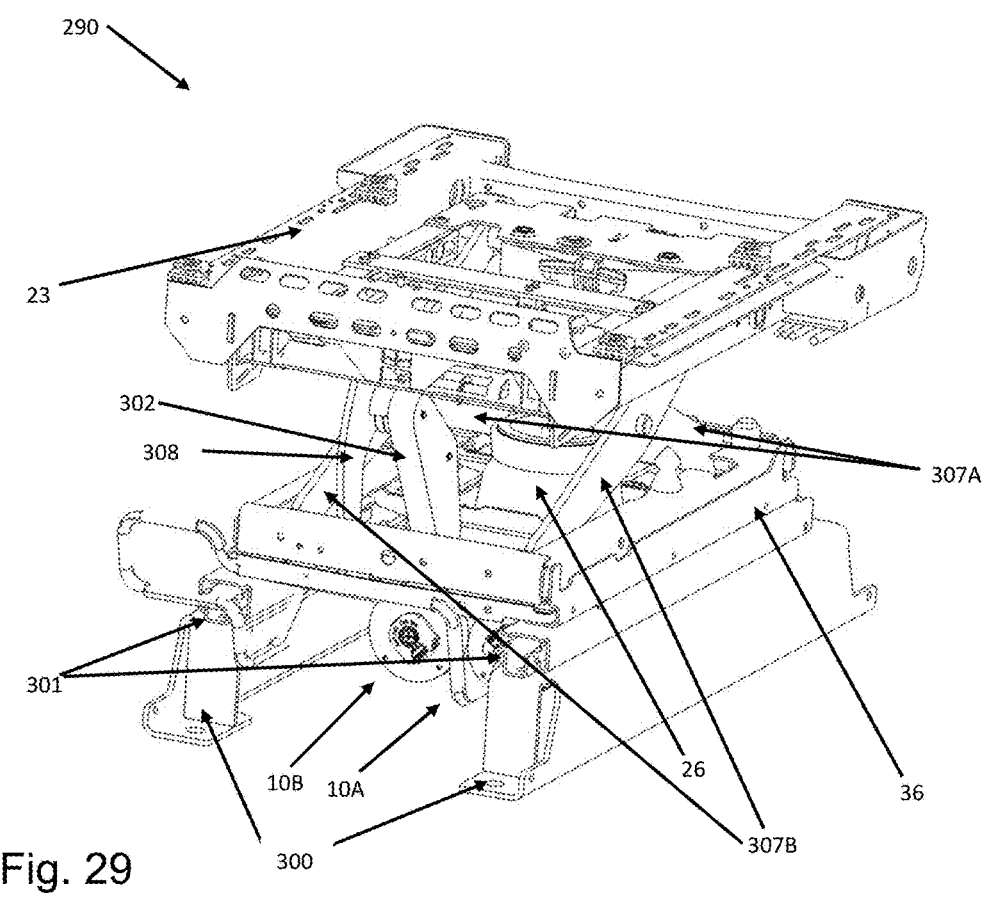
FIG. 29 is a perspective view of an active platform in accordance with an implementation of the active suspension system of FIG. 2.

FIG. 28 is a schematic view of an active suspension link 281 that may perform similar functions as the devices illustrated in FIG. 10. In FIG. 10, the active suspension changes the force from one wheel to the other by way of an adjustable rigidity anti-roll bar. In FIG. 28, the force from one wheel to the other is achieved by increasing of length of the link 281 with MR fluid actuator unit unit 11 that preloads one side to prevent roll of the body during torque transfer of acceleration. In FIG. 28, the MR fluid actuator unit 11 may provide force to a hydraulic cylinder 282 that builds pressure and transmits the force through hydraulic tubing 283 to another cylinder 284 that may adjust the length of the active suspension link 281. The system of FIG. 28 may be used as an active suspension system capable of leveling a car during cornering or that may provide an adjustable rigidity anti-roll bar to preload one side of the suspension in order to prevent the roll of the vehicle body during the torque transfer occurring during acceleration.

Referring to FIGS. 29-34, another embodiment of an active platform in accordance with the present disclosure is shown at 290. The active platform 290 may also be referred to as a platform with active suspension system. The active platform 290 may be used to partially eliminating vibrations and movements caused by the road, but the system may also simulate virtual environments in virtual reality. The active platform 290 is essentially configured to support a seat and actively control its position. As described previously, the active platform 290 is said to be "active", in that it applies forces to a platform, shown as a seat base 23 (e.g., to support a seat like the seat 23 of FIG. 2 or seat 251 of FIG. 25A) by a controlled actuator. The active platform 290 shares components with the various embodiments described in the present application, whereby like reference numbers will represent like components.

The embodiment of FIGS. 29-34 includes a scissor-type mechanism, or like support mechanism to support a seat via the seat base 23, with MR fluid actuator units integrated under the scissor-type mechanism, and thus under the seat base 23. This space-efficient positioning of the MR fluid actuator units in the support mechanism 36 may also be used in 4-bar linkage support mechanism like the one shown in FIGS. 3B to 4B. Moreover, although reference is made to a seat, the seat base 23 may be a platform for supporting other things than a seat. For example, the platform 23 may be for supporting any other occupant supporting item, such as a stretcher or carrier. However, for simplicity, reference is made to a seat base 23 in the description of the embodiment of FIGS. 29-34, even though the platform 23 can be used in other non-seat applications.

The scissor-type mechanism may include a pair of risers 300 or may be mounted onto an existing pair of risers 300 by which it is interfaced to a floor. The MR fluid actuator units 11 may be located between the pair of risers 300, in the footprint of the seat base 23. This may allow the use of an existing seat base, and thus limit the costs of integration and validation. The risers 300 each support a seat track 301 to support other parts of the scissor-type mechanism. The seat tracks 301 allow the forward and rearward displacement of the seat base 23 mounted to the active platform 290, relative a frame of a vehicle. The seat base 23 moves with the support mechanism 36, the latter being slidingly mounted to the seat tracks 301. As is conventional, the seat base 23 may be locked at a desired position along the seat tracks 301. As described after, the use of the cables 40 allows some flexibility in the relative position between the support mechanism 36 and the structure. The MR fluid actuator units 11 are fixed to the support mechanism 36 in order to move at the same time as the seat base 23 moving along the seat tracks 301 in translation relative to the risers 300. Alternatively, the MR fluid actuator units 11 could be fixed to the structure in which case the cables 40 would not constrain the horizontal adjustment.

An assembly of a tower 302 and a plate 303 take part of a transmission of forces to the seat base 23, and are thus part of the transmission of the system 290. The plate 303 is part of the structure of the scissor mechanism of the active platform 290. A pair of scissors are also part of the support mechanism 36, and are formed to support the weight of the seat base 23 and of its occupant, while allowing upward and downward movement.

Figure 30A:
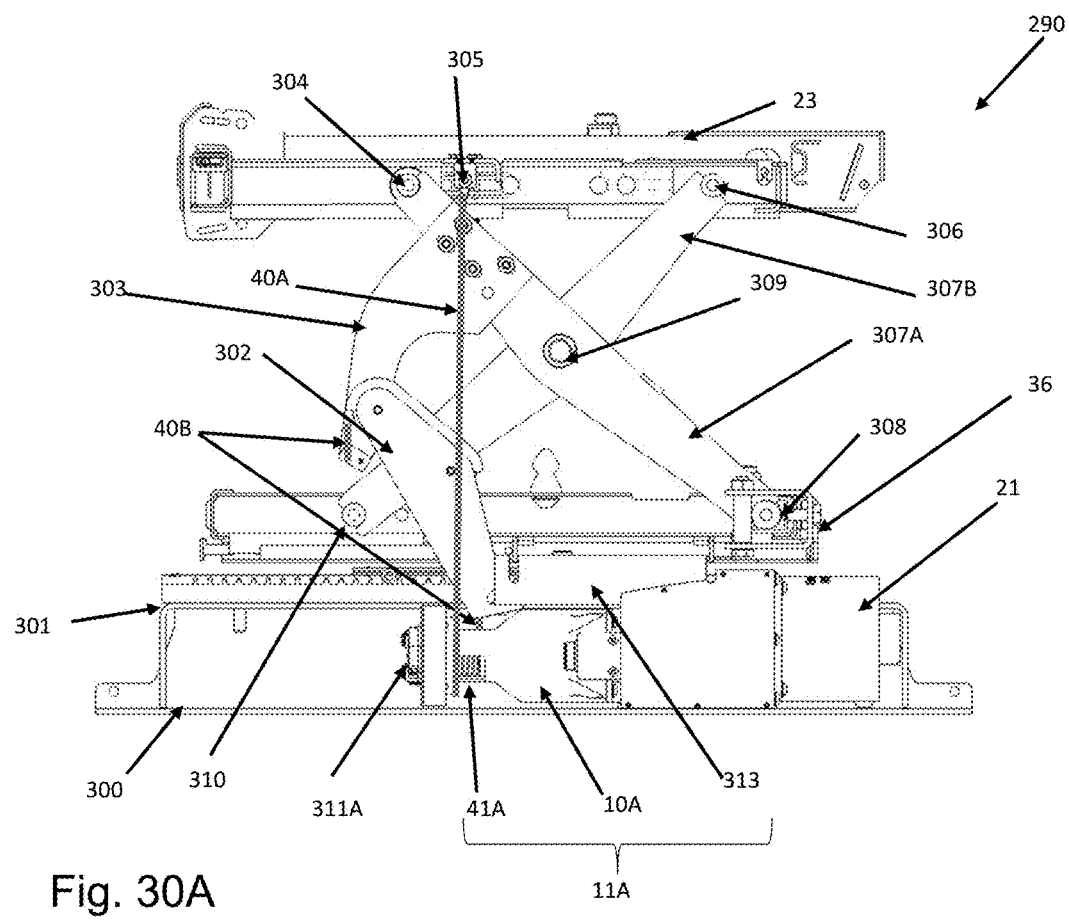
FIG. 30A is a side view of the active platform of FIG. 29, with a seat base raised.
Figure 30B:
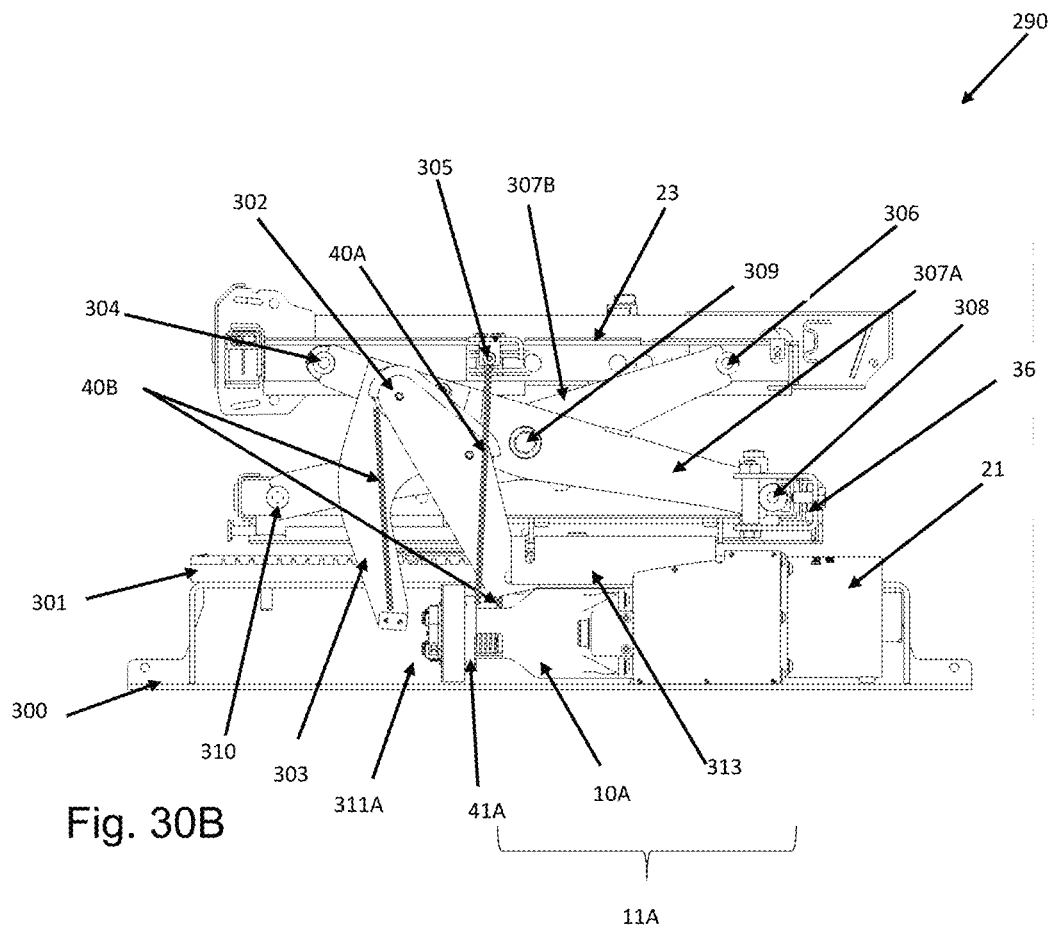
FIG. 30B is a side view of the active platform of FIG. 29, with a seat base lowered.

Each scissor has a pair of scissor members, namely scissor member 307A and 307B. The scissor members 307A each have a sliding pivot 304 at a top end. The sliding pivot 304 is configured to translate along a rail in the seat base 23 as best shown in FIG. 30A, while allowing a rotation of its scissor member 307A as the latter is constrained by its attachment to other scissor member 307B and to the structure, via a lower fixed pivot 308. The other scissor member 307B has a similar configuration, yet reversed, with a fixed pivot 306 rotatably connected to the seat base 23, and a sliding pivot 310 received in a rail at the bottom of the support mechanism 36, as is best shown in FIG. 30A. The scissor members 307A and 307B are interconnected by scissor pivot 309, to form half of the scissor mechanism as the scissor mechanism of the illustrated embodiment has two scissors. The scissor mechanism is a robust mechanism for supporting the seat base 23 and its occupant, and allow the seat base 23 to move up and down. A single degree of freedom is thus illustrated but multiple degree of freedom would be possible, with additional MR fluid clutch apparatuses 10. All pivots of the scissor mechanism, including the pivots 304, 306, 308, 309 and 310 may have appropriate bearing or bushing to allow proper rotation. Moreover, the translation of the sliding pivots 304 and 310 may rely on a rotation of a wheel in a rail.

Figure 31:
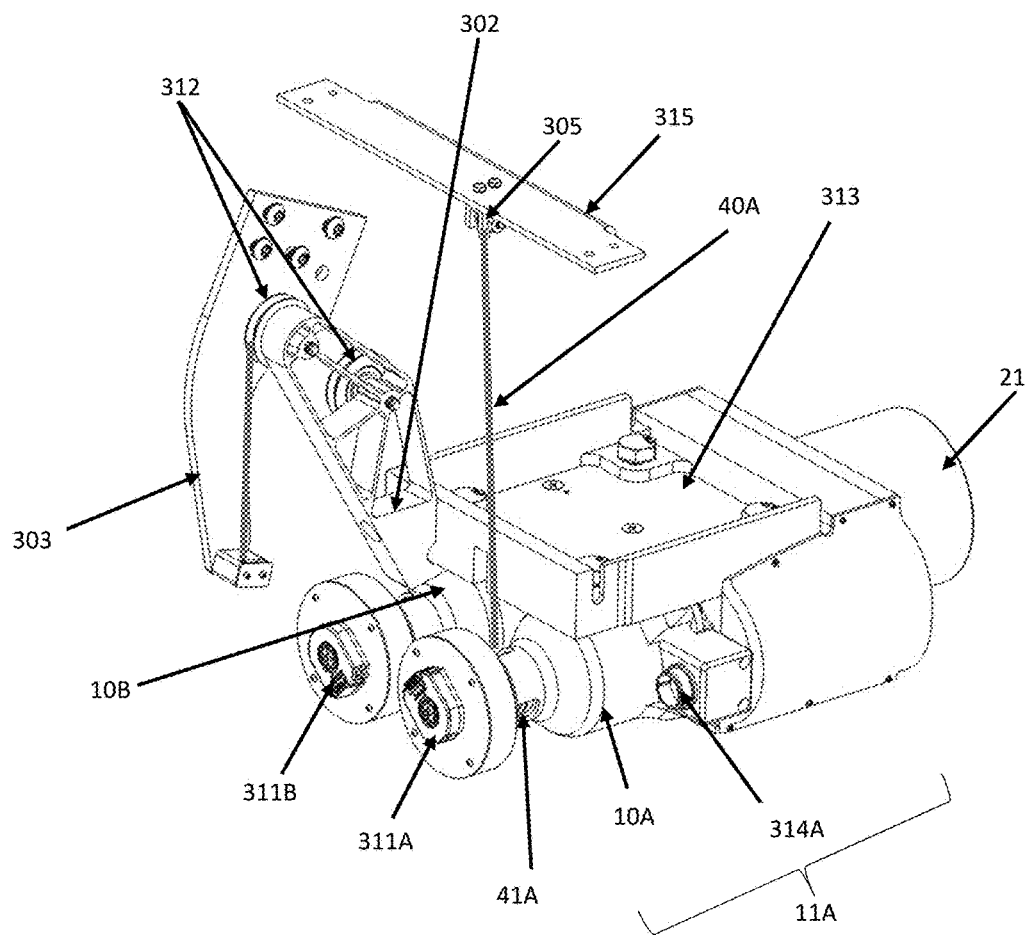
FIG. 31 is a perspective view of MR fluid actuator units and transmissions of the active platform of FIG. 29.

In order to actively control the vertical position of the seat base 23, the tower 302 and plate 303 collaborate with the MR fluid actuator 11B. The tower 302 is fixed to mounting plate 313, which itself is a structural component of the scissor mechanism, all of which are in a fixed relation with the MR fluid actuator units 11A and 11B. In the illustrated embodiment, the mounting plate 313 may translate with the scissors of the scissor mechanism and with the seat base 23. As best seen in FIG. 31, the tower 302 support two idler pulleys 312, upon which is routed the cable 40B. The tower 302 and mounting plate 313 therefore have the necessary structural integrity to sustain the forces of the cable 40B. The cable 40B has an end attached to the plate 303 and routed in the idler pulleys 312 to have its other end attached to the actuator 11B. The plate 303 is attached to first scissor member 307A, such that a pulling action on the cable 40B as it is wound onto a pulley or spool of the MR fluid actuator unit 11B will raise the first scissor member 307A, hence raising the seat base 23. The plate 303 is shown attached to the scissor member 307A but alternatively it may be attached to the seat base 23. The cable 40A on the other hand has its first end connected to the seat base 23 via the cable anchor 305 of transverse plate 315, and its second end wound onto a pulley or spool of the MR fluid actuator unit 11A to pull the seat base 23 down. This being said, the pulling down action may not be necessary as the active platform 290 may rely instead on gravity. However, the pulling down action may increase the dynamic response of the active suspension 290. Also, an air spring 26 or other biasing member may be installed in parallel to the scissor mechanism. The cables 40A and 40B may be tendons, or any other appropriate tensioning member. Moreover, as an alternative to the cable transmission described above, a gear mechanism similar to the one used in FIG. 3A may be used.

Referring to FIG. 31, in similar fashion to the embodiments described previously, it is shown that the MR fluid actuator unit 11A has a MR fluid clutch apparatus 10A, a pulley 41A directly on the shaft of the MR fluid clutch apparatus 10A and to which is connected the cable 40A, and a motor 21, for instance shared with the MR fluid actuator unit 11B. As the MR fluid actuator units 11 operate in a precise controlled manner based on sensor data, connector 314A may be used to connect the MR fluid actuator unit 11A to a controller of the active platform 290. The connector 314A may be wired to sensor 311A that detects the angular position of the pulley 41A, from which a controller system may determine the height of the seat base 23. Likewise, sensor 311B may detect the angular position of the pulley 41B, by which the controller system may calculate the height of the seat base 23 knowing the mechanical relation between the plate 303 and scissor mechanism. However, the two ways of calculating the height are mutually redundant, whereby only one of the sensors 311A and 311B may be used. However, in an effort to maintain the cables 40A and 40B taut for dynamic height control, the sensors 311A and 311B may be used to properly operate the MR fluid actuator units 11. The sensors 311A and 311B may be rotary encoders for example. Other sensors like accelerometers on the seat base 23, on the support mechanism 36, on risers 300 and/or any other portion of the active platform 290 may be used.

Figure 32:
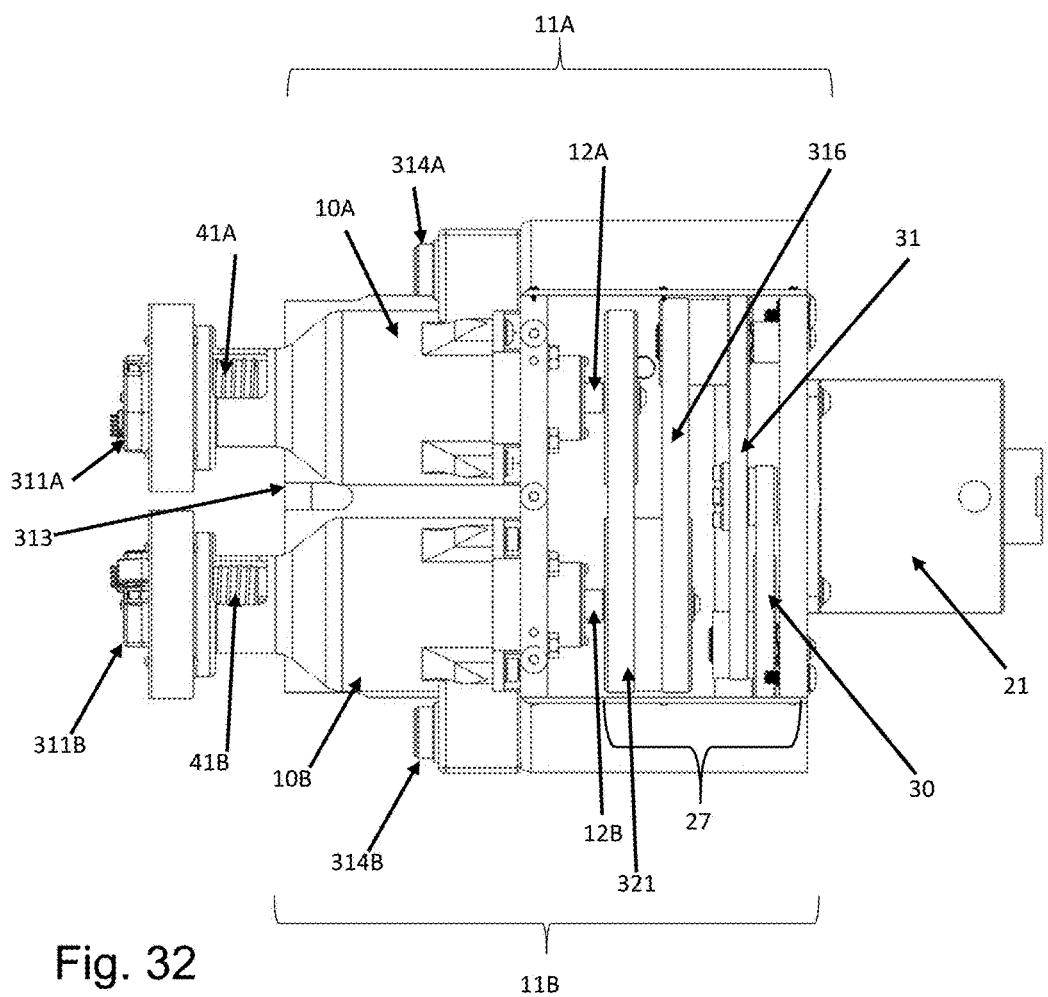
FIG. 32 is a bottom view of MR fluid actuator units of the active platform of FIG. 29.

Referring to FIG. 32, details of a transmission 27 between the MR fluid actuator units 11A and 11B is shown, in the form of a belt reduction mechanism. While other configurations are contemplated, the use of the belt reduction mechanism as described in FIG. 32 makes an efficient use of the limited space under the footprint of the seat base 23. Moreover, the arrangement of the MR fluid actuator units 11A and 11B, the motor 21 and transmission 27 may at least partially be fitted between the risers 300. The belt reduction mechanism 27 may include a first reduction stage 30, a second reduction stage 31 and a third reduction stage 316. In the illustrated embodiment, distribution belt 321 is used to distribute power to driving member 12A from driving member 12B. The torque of the motor 21 is hence distributed to both driving members 12A and 12B of MR fluid clutch apparatuses 10A and 10B, respectively. A single motor 21 is shown but multiple motors may be used, such as another configuration featuring one motor 21 for each MR fluid actuator unit 11. The use of one motor 21 per MR fluid actuator unit 11 may present the advantage of limiting the slip in the MR fluid actuator unit 11, hence extending the life of the MR fluid 16. In an embodiment, the motor 21 is a brushless DC motor. An example of a suitable motor 21, for illustrative purposes only, is an ElectroCraft RP34-112V24 motor, with a peak-torque specified at 277 N·cm. In a further embodiment, the belt reduction mechanism provides a reduction ratio between 10:1 and 22:1, with a particular embodiment of a ratio of approximately 16:1. With the above-referred arrangement and reduction, a pulling force of about 1000N may be achieved. In an embodiment, the pulling force is at a maximum of 600N, with a 15 Hz cut-off frequency.

Figure 33:
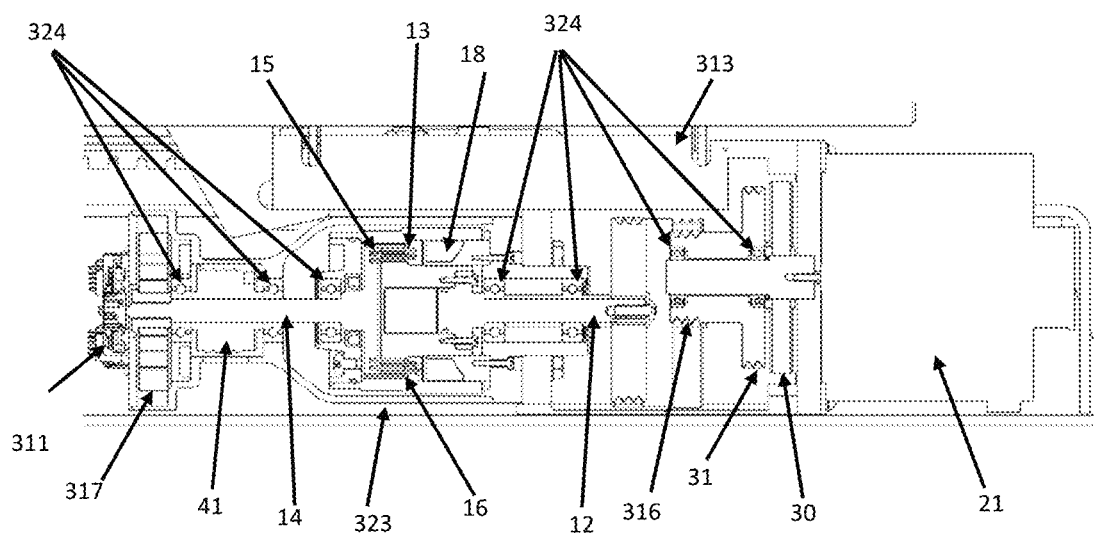
FIG. 33 is a sectional view of one of the MR fluid actuator units of the active platform of FIG. 29.

Referring to FIG. 33, an embodiment of the MR fluid actuator unit 11 is shown, and may be present in either one or both of the MR fluid actuator units 11A and 11B. In this arrangement, belt reduction mechanism as in FIG. 32 is used but another type of speed reducer, including but not limited to a planetary gear device, may be used. The function is similar to the MR fluid actuator unit 11 of FIG. 3B to 4B. In the embodiment, sensor 311 is present to provide information about the angular position of the pulley 41. A recoil spring 317 is present to maintain tension in the cable 40 (not illustrated) if the MR fluid actuator unit 11 is not powered and the platform 23 (not shown) is moved. Accordingly, the tension from the cable 40 is taken by the casing 323 via the bearings 324 (e.g., bushing type) that support the output shaft 14.

Figure 34:
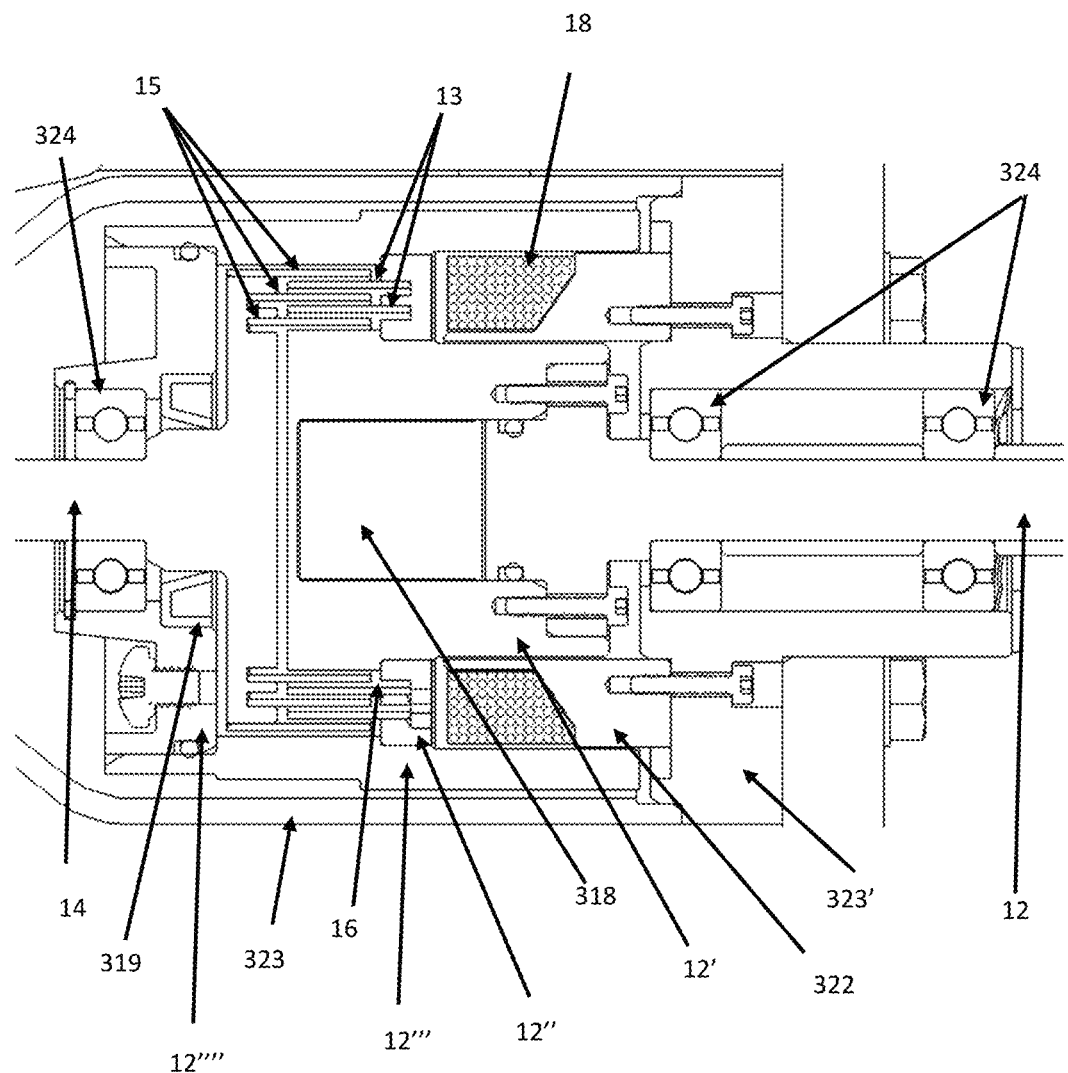
FIG. 34 is a sectional view of a MR fluid clutch apparatus of the MR fluid actuator units of the active platform of FIG. 29.

Referring to FIG. 34, an embodiment of the MR fluid clutch apparatus 10 is shown, and may be present in either one or both of the MR fluid actuator units 11A and 11B. The input drums 13 transmits torque to output drums 15 using the shear stress of MR fluid 16. A design with a single seal 319 may present the advantage of limiting the drag torque. Coil support 322 supports coil 18 and is mounted to the fixed casing 323'.

The invention claimed is:

1. An active suspension system comprising:
   a platform;
   a support mechanism to support the platform, the support mechanism providing at least one degree of freedom (DOF) to allow a vertical adjustment of the platform;
   at least one motor;
   at least one magnetorheological (MR) fluid clutch apparatus coupled to the at least one motor to receive torque from the motor, the MR fluid clutch apparatus controllable to transmit a variable amount of torque; and
   an assembly between the at least one MR fluid clutch apparatus and the support mechanism or platform to convert the torque received from the at least one MR fluid clutch apparatus into a force to move the platform in at least one direction of the DOF.

2. The active suspension system according to claim 1, further comprising at least one sensor for providing information indicative of a vertical position of the platform, and a controller for receiving the information indicative of the vertical position of the platform and for outputting a signal to control the at least one MR fluid clutch apparatus in exerting a desired force to control movement of the platform according to a desired movement behavior.

3. The active suspension system according to claim 1, comprising two of the at least one MR fluid clutch apparatus receiving torque from one motor, the two MR fluid clutch apparatuses outputting torque in opposite directions to cause a reciprocating movement of the platform via the support mechanism.

4. The active suspension system according to claim 1, further comprising a belt reduction mechanism coupling the at least one motor to the at least one MR fluid clutch apparatus.

5. The active suspension system according to claim 1, wherein the support mechanism includes a scissor mechanism having a pair of scissors constraining the platform to vertical movement.

6. The active suspension system according to claim 5, wherein the support mechanism includes a structure, the scissor mechanism operatively mounted to the structure.

7. The active suspension system according to claim 5, wherein the at least one MR fluid clutch apparatus and the at least one motor are located at least partially between the pair of scissors.

8. The active suspension system according to claim 7, wherein the at least one MR fluid clutch apparatus and the at least one motor are positioned below the platform at least partially in a footprint of the platform.

9. The active suspension system according to claim 1, wherein the support mechanism is supported by at least one track for horizontal position adjustment of the platform.

10. The active suspension system according to claim 9, wherein the at least one motor and the at least one MR fluid clutch apparatus are mounted onto a structure of the support mechanism so as to translate with the platform relative to the at least one track during horizontal position adjustment.

11. The active suspension system according to claim 1, wherein the assembly includes a tensioning member for each of the at least one MR fluid clutch apparatus, the tensioning member exerting a pulling force on the platform or on the support mechanism.

12. The active suspension system according to claim 11, comprising two of the at least one MR fluid clutch apparatus, one of the two MR fluid clutch apparatuses pulling on the platform via its tensioning member for downward movement of the platform, and the other one of the two MR fluid clutch apparatuses pulling on the support mechanism via its tensioning member for upward movement of the platform.

13. The active suspension system according to claim 11, further comprising a tower with at least one idler connected to a structure of the support mechanism for routing the tensioning member of the at least one MR fluid clutch apparatus into pulling one of the platform and the support mechanism to cause an upward movement of the platform.

14. The active suspension system according to claim 11, wherein a pulley is provided for each of the at least one MR fluid clutch apparatus, the pulley being directly connected to a shaft of the at least one MR fluid clutch apparatus.

15. The active suspension system according to claim 1, wherein the platform is a seat base.

16. The active suspension system according to claim 1, wherein the platform is a stretcher base.

* * * * *